(12) United States Patent
Zhang

(10) Patent No.: US 9,885,296 B2
(45) Date of Patent: Feb. 6, 2018

(54) METHOD AND SYSTEM FOR VACUUM GENERATION USING A THROTTLE BODY COMPRISING A SLIDABLE THROTTLE VALVE

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 12 days.

(21) Appl. No.: 14/945,254

(22) Filed: Nov. 18, 2015

(65) Prior Publication Data

US 2017/0138276 A1 May 18, 2017

(51) Int. Cl.
*F02D 9/02* (2006.01)
*F02D 41/00* (2006.01)
(Continued)

(52) U.S. Cl.
CPC .......... *F02D 41/0002* (2013.01); *F02D 9/02* (2013.01); *F02D 9/14* (2013.01); *F02D 13/0234* (2013.01); *F02D 41/005* (2013.01); *F02D 41/0077* (2013.01); *F02D 41/26* (2013.01); *F02M 35/10222* (2013.01); *F02M 35/10229* (2013.01); *F02M 35/10255* (2013.01); *F02D 23/00* (2013.01); *F02D 41/0007* (2013.01);
(Continued)

(58) Field of Classification Search
CPC .......... F02D 9/12; F02D 9/14; F02D 41/0002; F02D 41/0077; F02D 41/26; F02D 13/0234; F02D 23/00; F02D 2009/024; F02M 35/10255; F02M 35/10262; F02M 35/12; F02M 35/1205; F02M 35/1211; F02M 35/1222; F02M 35/1233; F02M 35/10118; F02M 35/10124; F02M 35/10301; F02M 19/08; F02M 19/081; F02M 19/082; F02B 27/02; F02B 27/0231; F02B 27/0236
USPC ........... 701/103; 123/184.53, 184.55, 184.56
See application file for complete search history.

(56) References Cited

U.S. PATENT DOCUMENTS 4,099,505 A * 7/1978 Stumpp .................. F02M 69/04
123/452
4,280,969 A * 7/1981 Swanson ................ F02M 9/103
261/62

(Continued)

OTHER PUBLICATIONS

Zhang, Xiaogang, "Method and System For Vacuum Generation Using A Throttle Comprising A Hollow Passage," U.S. Appl. No. 14/707,882, filed May 8, 2015, 54 pages.

*Primary Examiner* — Hai Huynh
*Assistant Examiner* — Gonzalo Laguarda
(74) *Attorney, Agent, or Firm* — Julia Voutyras; McCoy Russell LLP

(57) ABSTRACT

Various systems and methods are described for generating vacuum within an engine intake. A system may comprise an intake throttle including a slidable throttle valve, where the throttle valve may comprise a hollow interior passage, which in turn may be coupled to a vacuum consumption device. When vacuum is demanded by the vacuum consumption device, the throttle valve may be displaced downstream within the throttle to decrease airflow through the throttle and vacuum may be generated at tip of the throttle valve by flowing intake air between the throttle valve and a throttle fixture.

17 Claims, 9 Drawing Sheets

(51) Int. Cl.
*F02D 9/14* (2006.01)
*F02D 13/02* (2006.01)
*F02D 41/26* (2006.01)
*F02M 35/10* (2006.01)
*F02D 23/00* (2006.01)

(52) U.S. Cl.
CPC .. *F02D 2009/024* (2013.01); *F02D 2041/001* (2013.01); *F02D 2041/0017* (2013.01); *F02D 2250/41* (2013.01)

(56) References Cited

U.S. PATENT DOCUMENTS

| | | |
|---|---|---|
| 4,491,106 A | 1/1985 | Morris |
| 6,343,594 B1 * | 2/2002 | Koeslin .................. F02M 26/19 123/568.11 |
| 7,353,811 B2 * | 4/2008 | Weisz ...................... F02D 9/18 123/568.17 |
| 7,353,812 B1 | 4/2008 | Gosdzinski et al. |
| 7,690,349 B2 | 4/2010 | Bolanos |
| 8,261,716 B2 | 9/2012 | Bergbauer et al. |
| 8,353,266 B2 | 1/2013 | White et al. |
| 8,464,689 B2 | 6/2013 | Born et al. |
| 9,022,007 B2 | 5/2015 | Pursifull et al. |
| 9,494,087 B2 * | 11/2016 | Brett ........................ F02D 9/12 |
| 9,651,004 B2 * | 5/2017 | Zhang ............. F02M 35/10229 |
| 2003/0111065 A1 | 6/2003 | Blum |
| 2005/0188969 A1 | 9/2005 | Wheeler, III |
| 2011/0120414 A1 * | 5/2011 | Quantz .................... F02D 9/16 123/337 |
| 2014/0137839 A1 | 5/2014 | Russ |
| 2014/0360607 A1 | 12/2014 | Fletcher et al. |
| 2015/0285160 A1 | 10/2015 | Zhang |
| 2016/0326996 A1 * | 11/2016 | Zhang ............. F02M 35/10229 |

* cited by examiner

METHOD AND SYSTEM FOR VACUUM GENERATION USING A THROTTLE BODY COMPRISING A SLIDABLE THROTTLE VALVE

TECHNICAL FIELD

The present application relates to vacuum generation in an intake via a throttle valve.

BACKGROUND AND SUMMARY

Vehicle systems may include various vacuum consumption devices that are actuated using vacuum. These may include, for example, a brake booster and a purge canister. Vacuum used by these devices may be provided by a dedicated vacuum pump. In other embodiments, one or more aspirators (alternatively referred to as ejectors, venturi pumps, jet pumps, and eductors) may be coupled in the engine system that may harness engine airflow and use it to generate vacuum.

In yet another example embodiment shown by Bergbauer et al. in U.S. Pat. No. 8,261,716, a control bore is located in the wall of the intake such that when the throttle valve is at idle position, vacuum generated at the periphery of the throttle is used for a vacuum consumption device. Therein, the positioning of the throttle valve in an idle position provides a constriction at the throttle valve's periphery. The increasing flow of intake air through the constriction results in a Venturi effect that generates a partial vacuum. The control bore is sited so as to utilize the partial vacuum for a vacuum consumption device.

However, as recognized by the inventors herein, in the approaches described above, the vacuum generation potential of the throttle may be limited. For example, a single control bore at one location in the intake, as shown in U.S. Pat. No. 8,261,716, is utilized by the vacuum consumption device even though vacuum may be generated at the entire periphery of the throttle. To use vacuum generated at the entire periphery of the throttle, more control bores may be needed in the intake passage. However, fabricating these control bores may result in significant modifications to the design of the intake passage which can increase related expenses.

In the approaches that use one or more aspirators to generate vacuum, additional expenses may be incurred because of individual parts that form the aspirator including nozzles, mixing and diffusion sections, and check valves. Further, at idle or low load conditions, it may be difficult to control the total air flow rate into the intake manifold since the flow rate is a combination of leakage flow from the throttle and airflow from the aspirator. Typically, an aspirator shut off valve (ASOV) may be included along with the aspirator to control airflow but with added cost. Further, installing aspirators in the intake can lead to constraints on space availability as well as packaging issues.

As such, some approaches to address the above issues include providing a plurality of perforations around a circumference of a hollow intake throttle valve. The throttle valve may be adjusted to a more closed position to generate vacuum via intake airflow past the perforations on the circumference of the throttle valve. The generated vacuum is then applied to a vacuum consumption device fluidly coupled to the throttle valve via a hollow shaft.

The inventors herein have also identified potential issues with the above approach. As an example, the vacuum generation potential of the throttle is limited. As an example, the size of the perforations may be limited due to the width of the throttle valve, and therefore the vacuum generation potential of the throttle is limited. Thus, in order to increase the vacuum generated at the periphery of the throttle, the size of the perforations may need to be increased. However, increasing the size of the perforations may result in increases of the size and of the throttle which may result in significant modifications to the design of the intake passage which can increase related expenses.

The inventors herein have identified an approach to at least partly address the above issues. In one example approach, a throttle coupled in an intake conduit of an engine intake may comprise a throttle body, a slidable throttle valve included within the throttle body, the throttle valve comprising a hollow passage coupling a vacuum consumption device to an interior of the throttle body, and an inwardly projecting flange coupled within the throttle body. As an example, the throttle may be movable relative to the flange along a longitudinal axis of the throttle body between an open first position and a closed second position. An opening in the throttle body formed between the throttle valve and the flange may increase with increasing deflection of the throttle valve towards the open first position, away from the closed second position. Further, the throttle valve may include an aperture formed at an apex of the throttle valve by the hollow passage. A Venturi effect may be created at the apex of the throttle valve, and a magnitude of the Venturi effect may increase for decreases in a distance between the throttle valve and the flange. In this way, by moving the throttle valve to a more closed position, closer to the flange, vacuum may be generated at an apex of the throttle valve and used to draw air from a vacuum consumption device. In this way, an aspirator function may be integrated into the throttle.

As another example, a system may comprise an engine including an intake conduit, a throttle body included in the engine intake, the throttle body comprising, a throttle valve slidable along an axis substantially parallel to a direction of intake gas flow in the throttle body between an open first position and a closed second position, the throttle valve comprising a hollow passage fluidically coupling a vacuum consumption device to an interior of the throttle body, an inwardly projecting flow obstruction coupled within the throttle body, and a controller with computer-readable instruction stored in non-transitory memory for: in response to increases in vacuum demand, adjusting the throttle valve towards a more closed position to increase an amount of vacuum generated at an aperture of the throttle valve formed by the hollow passage at an inwardly extending tip of the throttle valve.

In yet another example, a method for an engine may comprise sliding a throttle valve within a throttle body of a throttle along an axis substantially parallel to a flow direction of intake gasses in the throttle, generating vacuum at a ridge of the throttle valve via intake air flowing past the ridge between the throttle valve and a throttle fixture of the throttle valve, and applying the generated vacuum to a vacuum consumption device fluidly coupled to the ridge of the throttle valve and flowing air from the vacuum consumption device into the throttle body.

In this way, a Venturi effect created between a throttle valve and a throttle fixture positioned in a throttle can be advantageously used to generate vacuum for a vacuum consumption device. The throttle valve may include a hollow interior passage that may be fluidically coupled to a vacuum consumption device for drawing air from the vacuum consumption device into the throttle. By adjusting the position, size, and/or shape of the throttle valve, the vacuum generation potential of the throttle valve may be increased. In addition, airflow into the intake manifold can be more accurately controlled by adjusting the distance between the throttle valve and the throttle fixture. Furthermore, since air received from the vacuum consumption device during vacuum application is received substantially at the throttle valve, airflow errors can be more accurately compensated for. By combining the functions of a throttle and an aspirator into a single throttle valve with a hollow interior passage, additional control valves, such as an ASOV, and parts may not be needed. By reducing the number and size of components required for vacuum generation, manufacturing expenses may be lowered and packaging issues may be averted.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
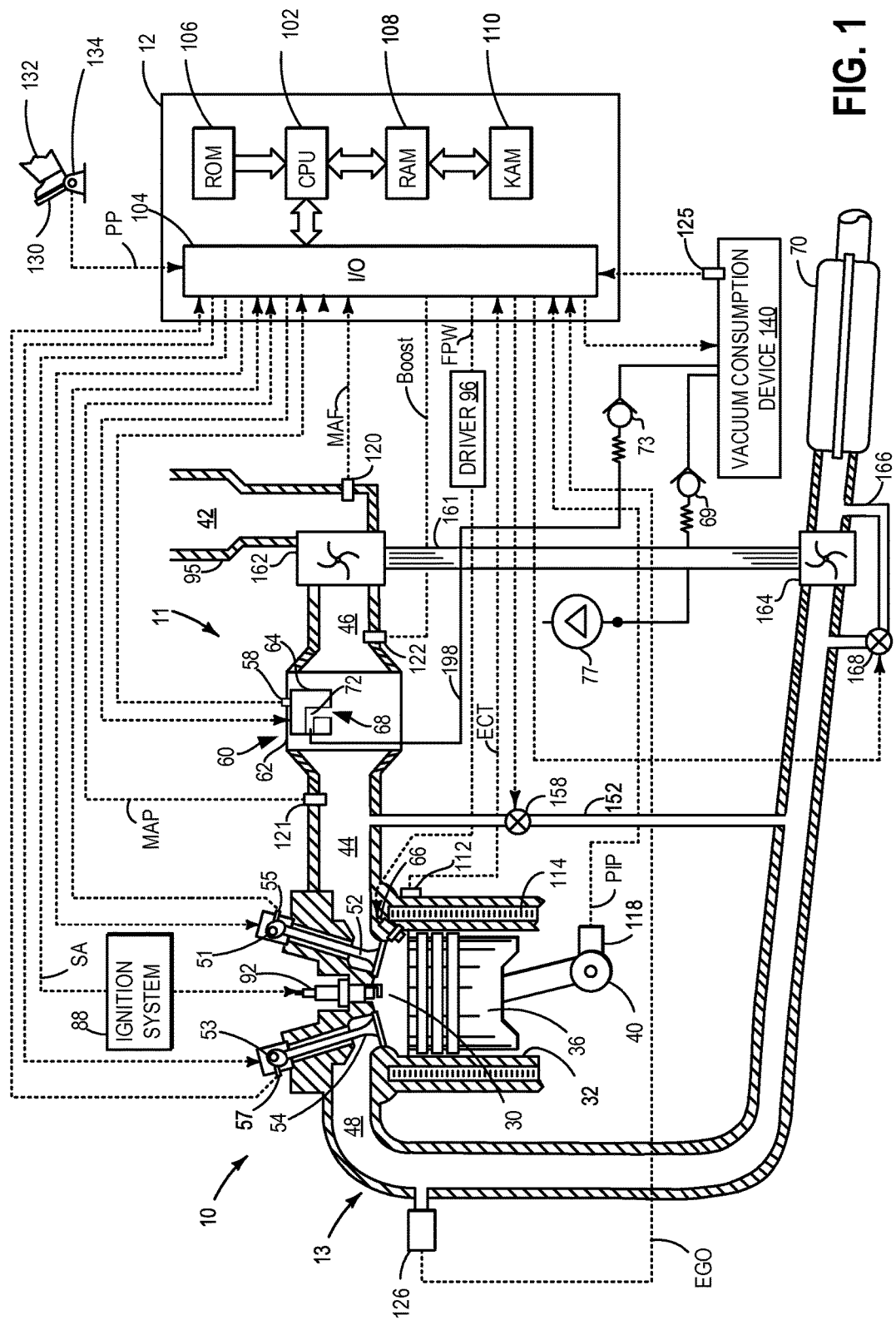
FIG. 1 portrays a schematic diagram of an engine in accordance with the present disclosure.
Figure 4A:
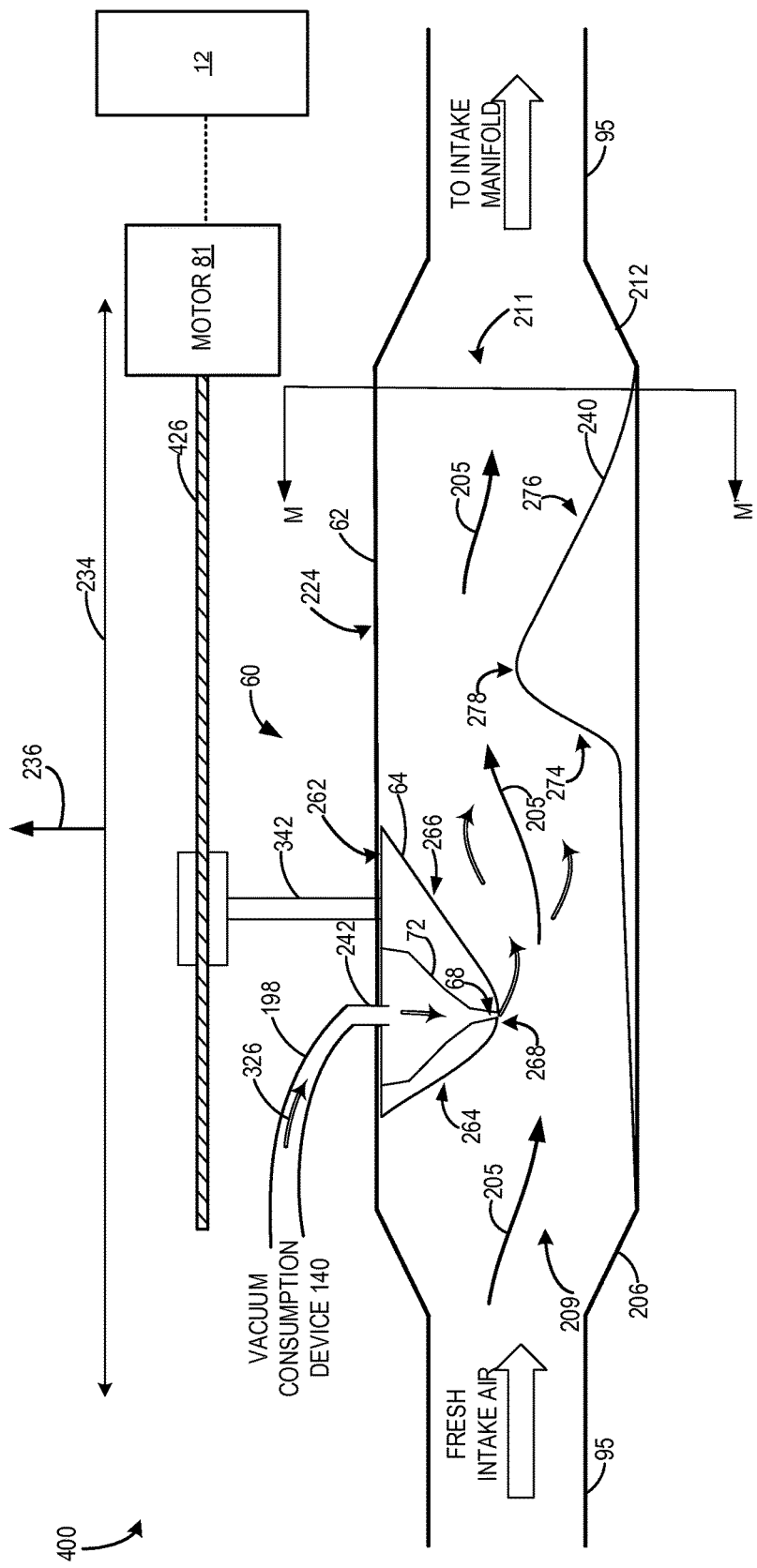
FIG. 4A shows a cross sectional view of the throttle of FIGS. 2A and 2B in an open first position.
Figure 4B:
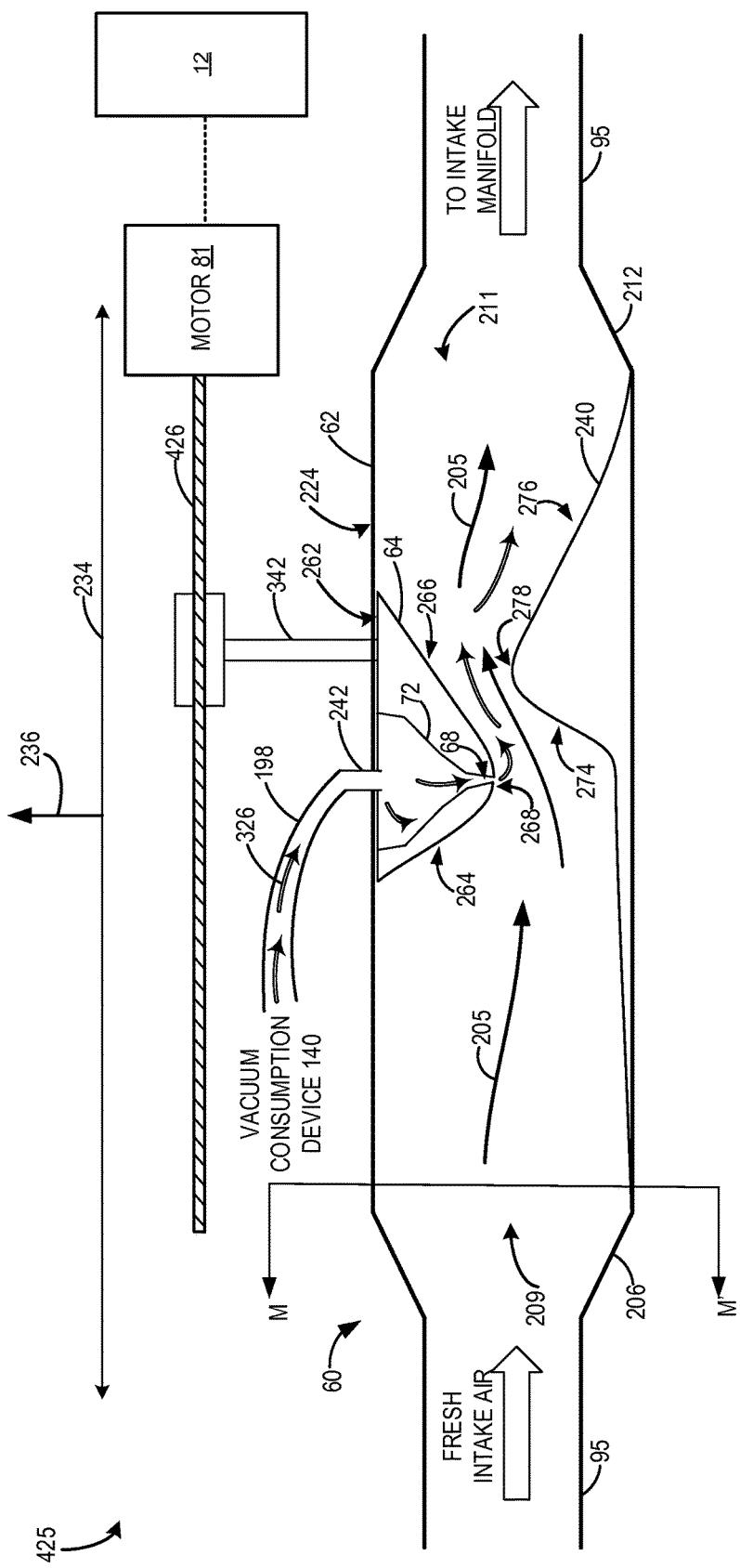
FIG. 4B shows a cross sectional view of the throttle in an intermediate third position.
Figure 4C:
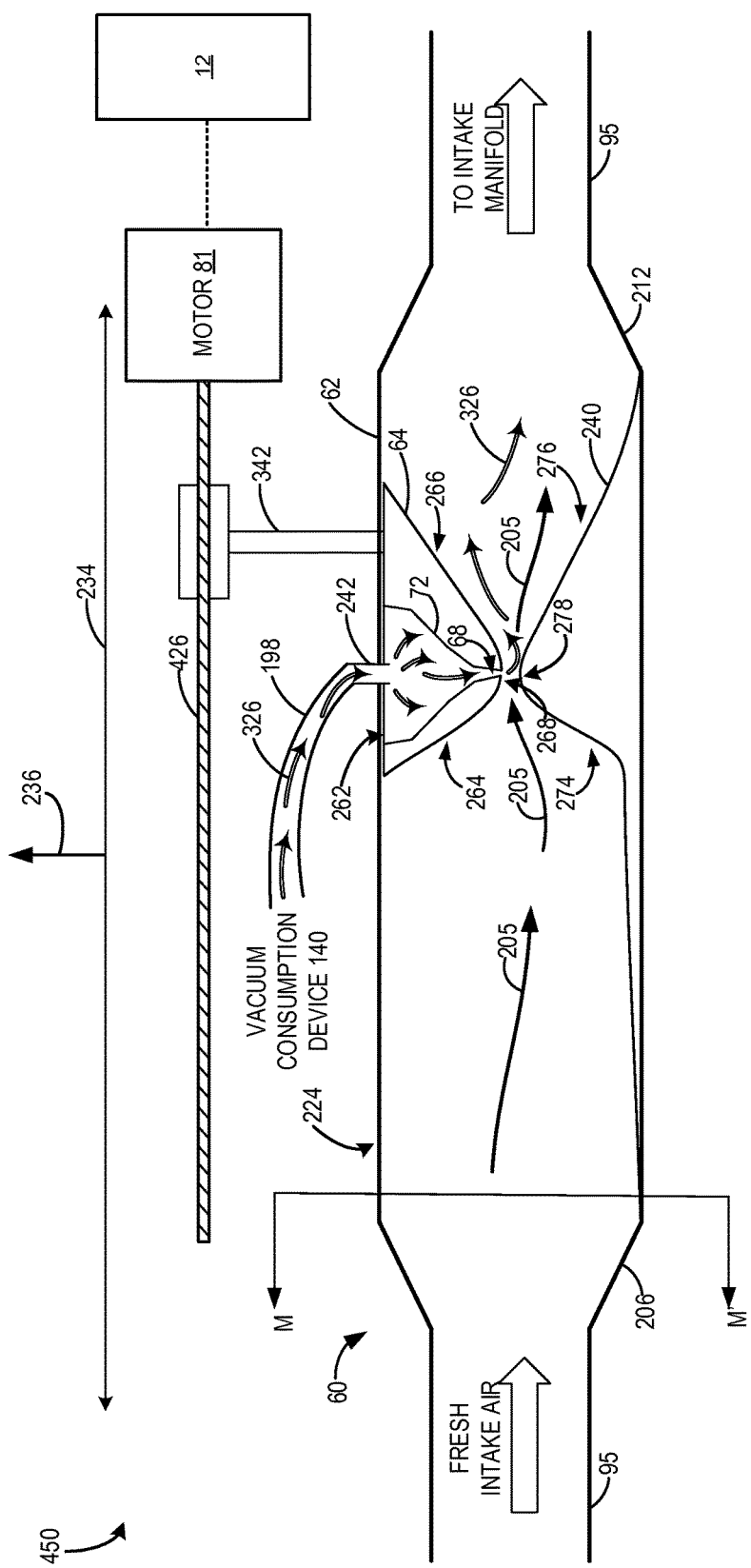
FIG. 4C shows a cross sectional view of the throttle in a closed second position.
Figure 5:
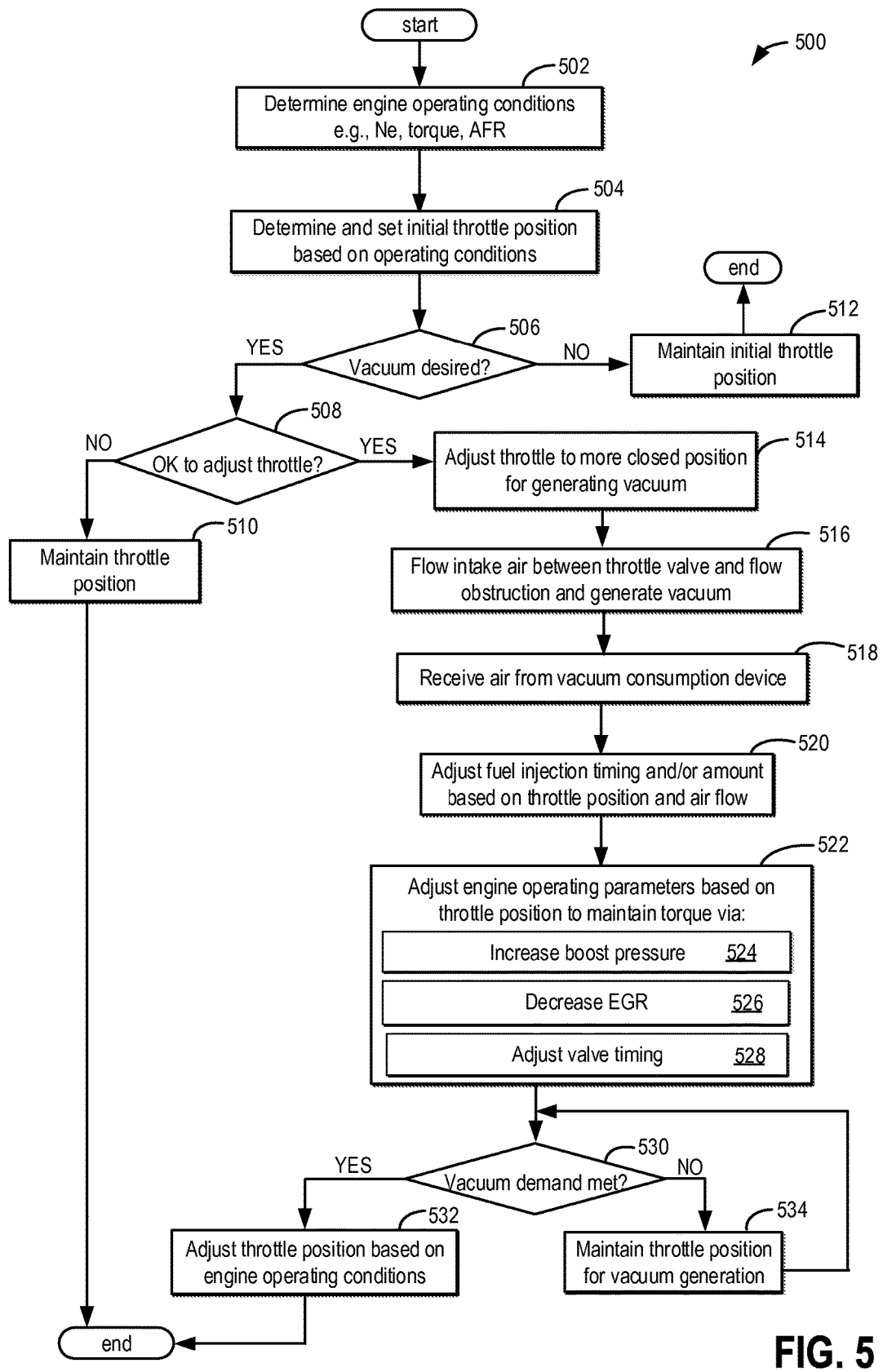
FIG. 5 is a flowchart illustrating an example method for adjusting throttle position and engine operating parameters.
Figure 6:
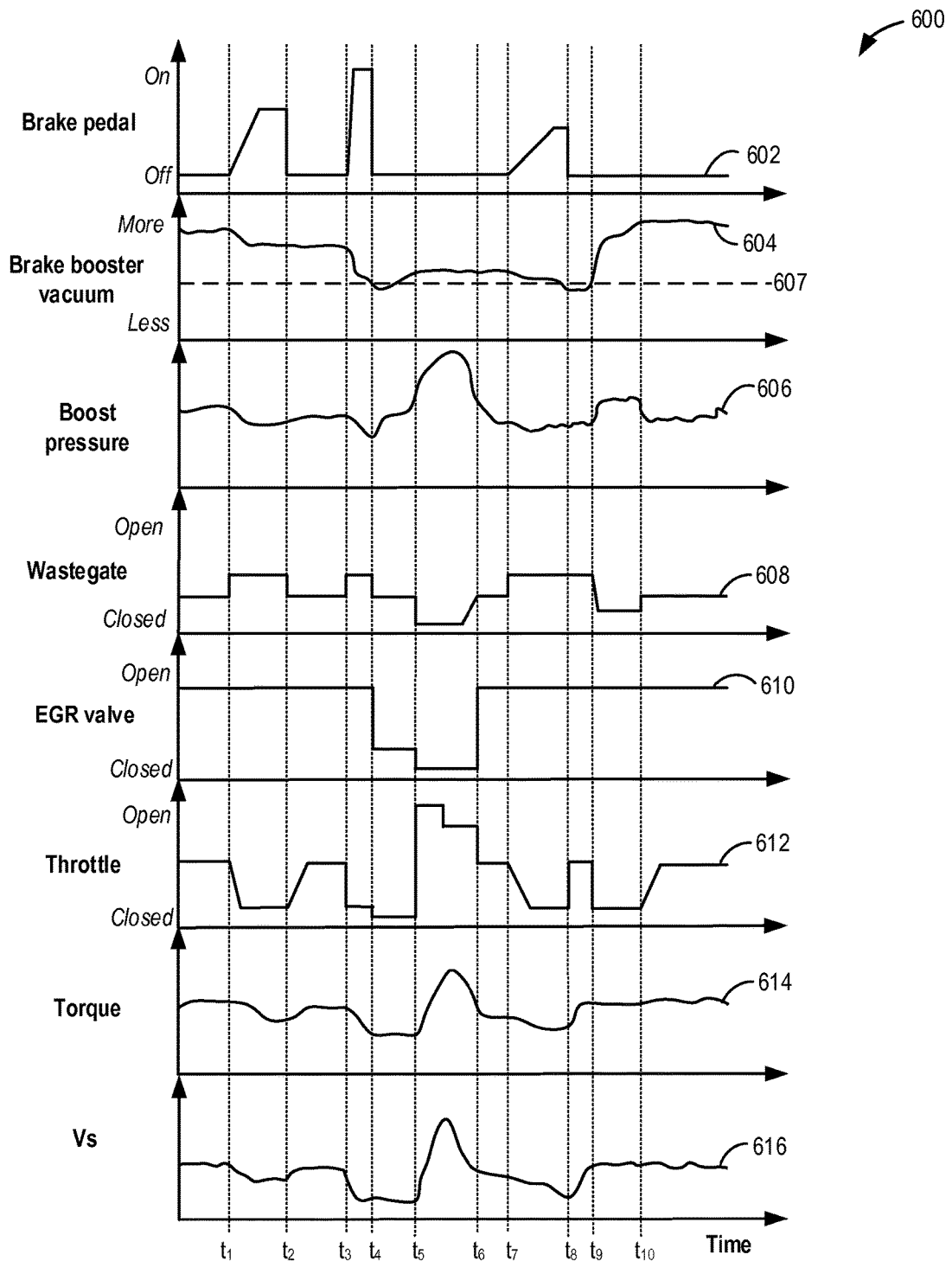
FIG. 6 portrays an example throttle position adjustment to improve vacuum generation with concurrent engine operating parameter adjustments to maintain engine torque, according to the present disclosure.

Methods and systems are described for generating vacuum within an intake passage in an engine, such as the engine system shown in FIG. 1. The intake passage may be provided with an intake throttle comprising a throttle body, such as the throttle body shown in FIG. 2A. Further, the throttle may include a slidable throttle valve with a hollow interior passage coupled to a vacuum consumption device, as shown in FIGS. 2B-4C. The throttle may additionally include an inwardly projecting flange, protruding from walls of the throttle body. As such, both the flange and the throttle valve may protrude inwards towards the center of the throttle body from walls of the throttle body. Thus, the throttle body may be constricted at the flange and the throttle valve. By adjusting the position of the throttle valve, the distance between the flange and the throttle valve, and therefore an amount of narrowing in the throttle, may be varied. Due to the narrowing of the throttle created by the throttle valve and the flange, vacuum may be generated between the throttle valve and the flange, and may be used to draw gasses from a vacuum consumption device. Further, the amount of vacuum generated between the flange and the throttle valve may depend on the distance between the throttle valve and the flange, and therefore the amount of vacuum generated by the throttle may be adjusted by adjusting the position of the throttle valve. A controller may be configured to perform a routine to modify a position of the throttle valve based on vacuum demand from the vacuum consumption device as shown in FIG. 5. As shown in FIGS. 4A-4C, the controller may send signals to an actuator which may in turn adjust the position of the throttle valve based on signals received from the controller. Various operating parameters may be adjusted as shown in FIG. 6, as throttle position is varied, to maintain engine torque.

Referring now to FIG. 1, it shows a schematic depiction of a spark ignition internal combustion engine 10 including an engine intake 11 and an engine exhaust 13, selectively communicating with one or more combustion chambers, of which only one is shown in FIG. 1. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP.

Combustion chamber 30 (also known as cylinder 30) of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel (not shown) to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Engine intake 11 may comprise an intake conduit 95, through which intake gasses flow en route to the combustion chamber 30. Thus, engine intake 11 may include intake passage 42, boost chamber 46, and intake manifold 44. The products of combustion may then be expelled from the combustion chamber 30 via opening of exhaust valve 54 to exhaust passage 48.

In this example, intake valve 52 and exhaust valve 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 96. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake manifold 44 in a configuration that provides what is known as port injection of fuel into the intake port upstream of combustion chamber 30.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Engine 10 may further include a compression device such as a turbocharger or supercharger including at least a compressor 162 arranged along intake passage 42. For a turbocharger, compressor 162 may be at least partially driven by a turbine 164 (e.g., via a shaft) arranged along exhaust passage 48. Compressor 162 draws air from intake passage 42 to supply boost chamber 46. Exhaust gases spin turbine 164 which is coupled to compressor 162 via shaft 161. For a supercharger, compressor 162 may be at least partially driven by the engine and/or an electric machine, and may not include a turbine. Thus, the amount of compression provided to one or more cylinders of the engine via a turbocharger or supercharger may be varied by controller 12.

A wastegate 168 may be coupled across turbine 164 in a turbocharger. Specifically, wastegate 168 may be included in a bypass 166 coupled between an inlet and outlet of the exhaust turbine 164. By adjusting a position of wastegate 168, an amount of boost provided by the turbine may be controlled.

Intake manifold 44 is shown communicating with throttle 60 having a throttle body 62 and a throttle valve 64. In this particular example, the position of throttle valve 64 may be varied by controller 12 via a signal provided to an electric motor or actuator (shown below with reference to FIGS. 4A-4C) included with throttle 60, a configuration that is commonly referred to as electronic throttle control (ETC). Throttle position may be varied by the electric motor via a shaft. As elaborated in FIGS. 2B-4C, throttle valve 64 may include an opening 68 which fluidically couples an interior of the throttle 60 with vacuum consumption device 140. Throttle 60 may control airflow from intake boost chamber 46 to intake manifold 44 and combustion chamber 30 among other engine cylinders. The position of throttle valve 64 may be provided to controller 12 by throttle position signal TP from throttle position sensor 58. As such, the position of the throttle valve 64 may be adjusted by the electric motor based on signals received from the controller 12. Said another way, the controller 12 may send signals to the electric motor for adjusting the position of the throttle valve 64.

Engine 10 is coupled to vacuum consumption device 140 which may include, as non-limiting examples, one of a brake booster, a fuel vapor canister, and a vacuum-actuated valve (such as a vacuum-actuated wastegate). Vacuum consumption device 140 may receive vacuum from a plurality of vacuum sources. One source may be vacuum pump 77 that may be selectively operated via a control signal from controller 12 to supply vacuum to vacuum consumption device 140. Check valve 69 allows air to flow to vacuum pump 77 from vacuum consumption device 140 and limits airflow to vacuum consumption device 140 from vacuum pump 77. Another source of vacuum may be throttle valve 64 which is positioned within boost chamber 46.

Throttle valve 64 has a hollow interior passage 72. As shown in FIG. 1, an opening 68 at an exterior surface of the throttle valve 64 may be formed by the hollow interior passage 72. The opening 68 may therefore be connected to vacuum consumption device 140 via interior passage 72, and conduit 198, coupled to the interior passage 72. When throttle valve 64 is in a mostly closed or a fully closed position, vacuum may be generated at the opening 68 of throttle valve 64 as intake air flows through the throttle body 62. This vacuum may draw air from vacuum consumption device 140 via conduit 198 and interior passage 72 of the throttle valve 64. As such, throttle 60 may also be referred to as aspirator integrated throttle 60 in the description herein. This air may then flow out of throttle valve 64 via opening 68. Check valve 73 ensures that air flows from vacuum consumption device 140 to throttle valve 64 and thereon into intake manifold 44 and not from intake manifold 44 to vacuum consumption device 140.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof.

An exhaust gas recirculation (EGR) system may be used to route a desired portion of exhaust gas from exhaust passage 48 to intake manifold 44 through conduit 152 via EGR valve 158. Alternatively, a portion of combustion gases may be retained in the combustion chambers, as internal EGR, by controlling the timing of exhaust and intake valves.

Controller 12 is shown in FIG. 1 as a conventional microcomputer including: microprocessor unit 102, input/output ports 104, read-only memory 106, random access memory 108, keep alive memory 110, and a conventional data bus. Controller 12 commands various actuators such as throttle valve 64, EGR valve 158 and the like. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to input device 130 for sensing accelerator position adjusted by vehicle operator 132; a measurement of engine manifold pressure (MAP) from pressure sensor 121 coupled to intake manifold 44; a measurement of boost pressure from pressure sensor 122 coupled to boost chamber 46; a measurement of vacuum in vacuum consumption device 140 from pressure sensor 125, a profile ignition pickup signal (PIP) from Hall effect sensor 118 (or other type) coupled to crankshaft 40; a measurement of air mass entering the engine from mass airflow sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, read-only memory 106 may be programmed with computer readable data representing instructions executable by microprocessor unit 102 for performing the methods described below as well as other variants that are anticipated but not specifically listed. Thus, the computer readable instructions may be stored in non-transitory memory, such as in read-only memory 106, the instructions executable by the microprocessor unit 102 for performing the methods described herein. Example routines are described herein at FIG. 5.

As described above, FIG. 1 merely shows one cylinder of a multi-cylinder engine, and that each cylinder has its own set of intake/exhaust valves, fuel injectors, spark plugs, etc. Also, in the example embodiments described herein, the engine may be coupled to a starter motor (not shown) for starting the engine. The starter motor may be powered when the driver turns a key in the ignition switch on the steering column, for example. The starter is disengaged after engine start, for example, by engine 10 reaching a predetermined speed after a predetermined time.

Figure 2A:
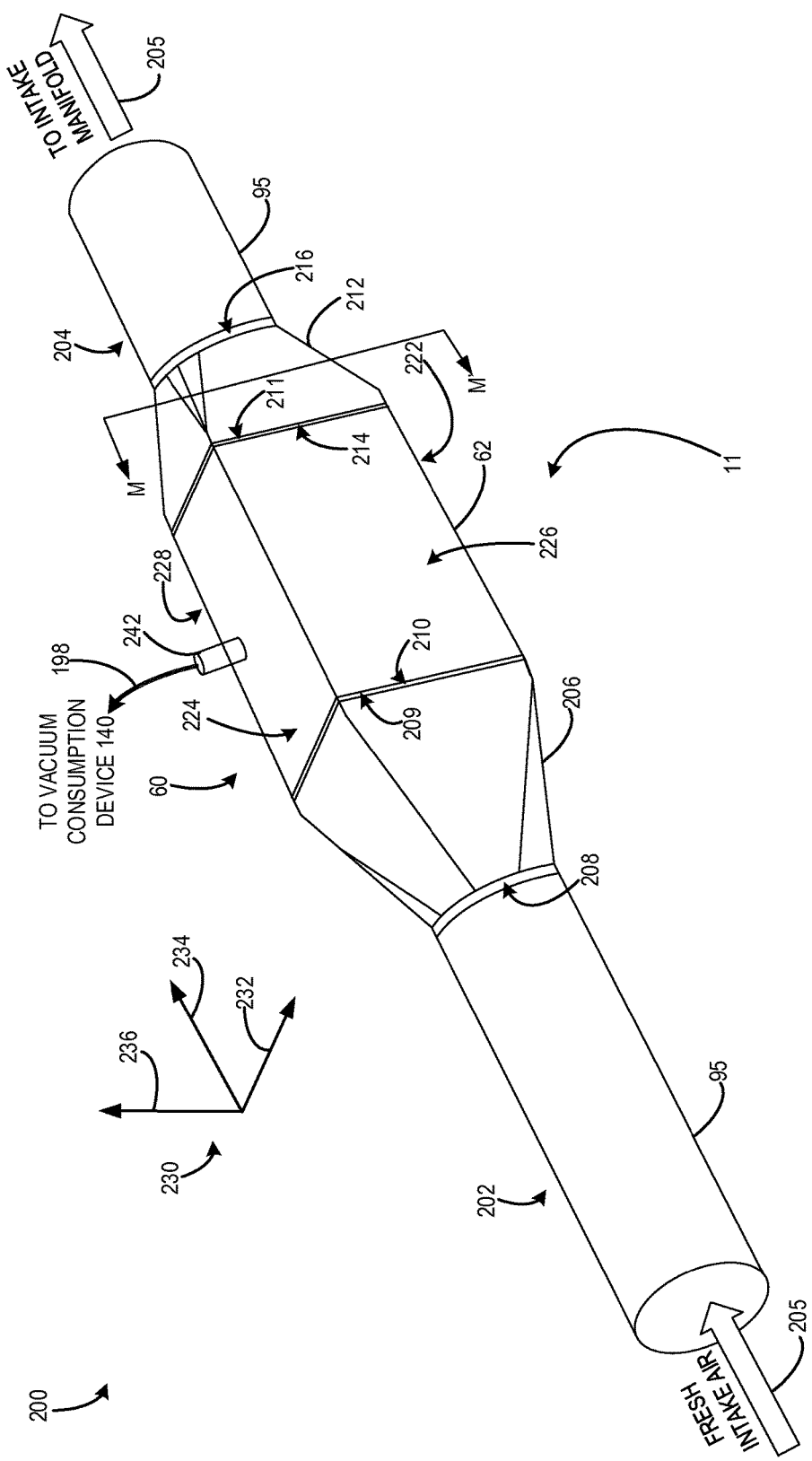
FIG. 2A depicts an exterior side perspective view of a portion of an engine intake included in the engine shown in FIG. 1, and including a throttle.
Figure 2B:
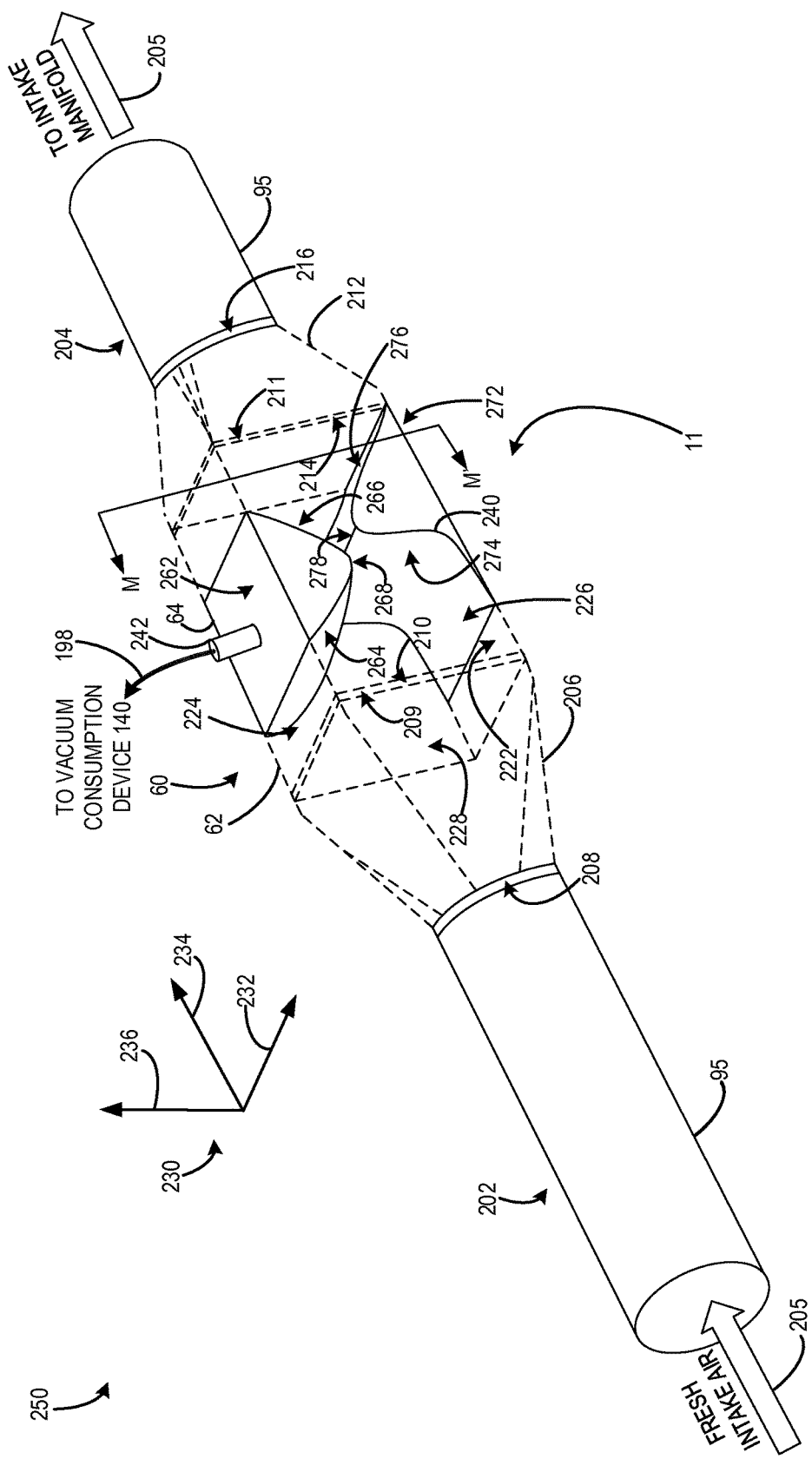
FIG. 2B depicts an interior side perspective view of the portion of the engine intake shown in FIG. 2A, including the throttle.

FIGS. 2A and 2B illustrate side perspective views of a portion of engine intake 11 of engine 10 of FIG. 1 that includes throttle 60. As such, components previously introduced in FIG. 1 are numbered similarly in FIGS. 2A and 2B and may not be reintroduced.

FIG. 2A shows an exterior side perspective view 200 of throttle 60 incorporated in intake conduit 95 within engine intake 11. FIG. 2B shows an interior side perspective view 250 of the throttle 60. Specifically, FIG. 2B shows the same side perspective view of throttle 60 shown in FIG. 2A, except that in FIG. 2B, the throttle 60 is illustrated as transparent, so as to expose the throttle valve 64 and interior of the throttle 60. FIGS. 2A and 2B may therefore be described together in the description herein.

In the description herein, axis system 230 may be used to describe the relative positioning of components of the throttle 60. The axis system 230 may comprise a vertical axis 236, a longitudinal axis 234, and a lateral axis 232. A "height" of the throttle 60 and/or its components may be used to define the extent of the components along the vertical axis 236. Similarly a "length" of components of the throttle 60 may be used to refer to the physical extent of the components along the longitudinal axis 234. The physical extent of components along the lateral axis 232 may be referred to as a "width." Cutting plane M-M' defines the cross-sectional view of the intake 11 shown in FIGS. 4A-4C.

The throttle 60 may include the throttle body 62, the throttle body 62 comprising four walls: a top wall 224 opposite a bottom wall 222, the top wall 224 and bottom wall 22 defining the height of the throttle 60, and two side walls 226 and 228, the side walls 226 and 228 defining the width of the throttle 60. Thus, the top wall 224 may be referred to as the "top" of the throttle 60. Similarly the bottom wall 222 may be referred to as the "bottom" of the throttle 60.

Front side wall 226, and back side wall 228 may physically couple bottom wall 222 and top wall 224. As shown in the examples of FIGS. 2A and 2B, the walls 222, 224, 226, and 228 may be relatively flat and planar. As such, the throttle body 62 may be approximately rectangular. Specifically, the walls 222, 224, 226, and 228 may define a rectangular prism. However, it should be appreciated that in other examples, the walls 222, 224, 226, and 228 may be curved. As such, the shape and size of the throttle 60, and the shape, size, and configuration, of the walls 222, 224, 226, and 228 may be different than as depicted in FIGS. 2A and 2B. Further, it should be appreciated that in other examples, the throttle body 62 may take on other prismatic shapes.

The walls 222, 224, 226, and 288 of the throttle 60 may be comprised of any suitable material such as plastic, metal, metal alloy, etc. Further, the walls 222, 224, 226, and 228 of the throttle body 62 may be thin, so that they define a hollow interior of throttle 60. As such, intake gasses may flow through the interior of the throttle body 62 en route to an intake manifold (e.g., intake manifold 44 shown above with reference to FIG. 1) as shown by the flow arrows 205 in FIGS. 2A and 2B. The walls 222, 224, 226, and 228 may be in sealing contact with one another along their edges, so that interior and exterior portions of the throttle 60 and intake 11 are sealed off from one another. Thus, intake gasses flow from an upstream first portion 202 of intake conduit 95, through throttle body 62, to downstream second portion 204 of intake conduit 95. Said another way, intake gasses may only enter and/or exit the throttle 60 through intake conduit 95.

A cross-sectional area of the throttle body 62 may be greater than that of the intake conduit 95. The cross-sectional area may be defined as a cross-section taken along a plane defined by the vertical axis 236 and lateral axis 232. Thus, the cross-sectional area may be substantially perpendicular to intake gas flow through the engine intake 11. Said another way, the volume included within a given length of the throttle body 62 may be greater than that of the volume included within a similar length of the intake conduit 95.

As such, the throttle 60 may further include an inlet cone 206 physically coupling the throttle body 62 to the upstream first portion 202 of intake conduit 95, and an outlet cone 212 physically coupling the throttle body 62 to the downstream second portion 204 of intake conduit 95. Thus, the cones 206 and 212 may physically couple the narrower intake conduit 95 with the wider throttle body 62. Therefore, an upstream first end 208, also referred to herein as inlet end 208 of inlet cone 206 may be smaller than a downstream second end 210, also referred to herein as outlet end 210. Said another way, a cross-sectional area of the inlet cone 206 may be greater at the outlet end 210 than at the inlet end 208. Similarly, an upstream first end 214, also referred to herein as inlet end 214 of outlet cone 212 may be larger than a downstream second end 216, also referred to herein as outlet end 216. Said another way, a cross-sectional area of the outlet cone 212 may be smaller at the outlet end 216 than at the inlet end 214.

In some examples, the diameter, and thus the cross-sectional area of the intake conduit 95 may be approximately the same along the length of the intake conduit 95. Thus, the size of inlet end 208 of the inlet cone 206 and outlet end 216 of the outlet cone 212 may be approximately the same and/or similar. However, it should be appreciated that in some examples, the diameter of the intake conduit 95 may vary along its length, and as such, the outlet end 216 and inlet end 208 may not be the same shape and/or size. Further the cross-sectional area of the throttle body 62 may be approximately the same along the length of the throttle body 62. Thus, the size of the outlet end 210 of the inlet cone 206, and inlet end 214 of the outlet cone 212 may be approximately the same and/or similar. However, it should be appreciated that in other examples, the throttle body 62 may not be rectangular and may take on another shape, where the cross-sectional area of the throttle body 62 may vary along its length. In such examples, the inlet end 214 and outlet end 210 may be different in size and/or shape.

The upstream first end 208 of inlet cone 206 may be physically coupled to, and in sealing contact with, the upstream first portion 202 of intake conduit 95. Further, the downstream second end 210 of inlet cone 206 may be physically coupled to, and in sealing contact with a downstream first end 209 of throttle body 62, where the downstream first end 209 may be formed by upstream edges of the walls 222, 224, 226, and 228. Similarly, an upstream first end 214 of outlet cone 212 may be physically coupled to, and in sealing contact with, a downstream second end 211 of throttle body 62, where the downstream second end 211 may be formed by downstream edges of the walls 222, 224, 226, and 228. Further, a downstream second end 216 of outlet cone 212 may be physically coupled to, and in sealing contact with the downstream second portion of intake conduit 95.

The downstream first end 209 and downstream second end 211 of the throttle body 62 are open. Thus, no walls may be formed at either the downstream first end 209 or the downstream second end 211. Further, upstream first end 208 and downstream second end 210 of inlet cone 206, and upstream first end 214 and downstream second end 216 of outlet cone 212 are open. Additionally, the interior of the cones 206 and 212 may be hollow, so that intake air may flow relatively unobstructed through the cones 206 and 212. Thus, no walls may be formed at either the upstream first ends 208 and 214 or the downstream second ends 210 and 216. In this way, intake air flows from upstream first portion 202 of intake conduit 95 through the throttle 60, and on to downstream second portion 204 of intake conduit 95 en route to the intake manifold. Specifically, intake air may flow from upstream first portion 202 of intake conduit 95 through inlet cone 206, into throttle body 62, out through outlet cone 212, to downstream second portion 204 of intake conduit 95. However, it should be appreciated that in other examples, inlet and outlet cones 206 and 212, respectively, may not be included in throttle 60. In such examples, the upstream first portion 202 of intake conduit 95 may be directly physically coupled to downstream first end 209 of the throttle body 62. Further, the downstream second portion 204 of the intake conduit 95 may be directly physically coupled to the downstream second end 211 of the throttle body 62. As such, intake gasses may flow from upstream first portion 202 of intake conduit 95 into the throttle body 62 via the open downstream first end 209, and may flow out of throttle body 62 to the downstream second portion 204 of the intake conduit 95 via the open downstream second end 211.

Throttle body 62 may additionally include a shaft 242 providing fluidic communication between the vacuum consumption device 140 and interior of the throttle body 62. Specifically, shaft 242 may be coupled to conduit 198, the conduit 198 coupled to the vacuum consumption device 140, as described above with reference to FIG. 1. Thus, shaft 242 may extend through top wall 224 of the throttle body 62. Shaft 242 may be substantially hollow, and as such gasses may flow there-through. As explained in greater detail below with reference to FIGS. 4A-4C, vacuum may be generated within the throttle body 62, drawing gasses from the vacuum consumption device 140, through conduit 198, shaft 242, and into the throttle body 62.

Focusing now on FIG. 2B, the exterior walls 222, 224, 226, and 228 of the throttle body 62, and walls of the inlet cone 206 and outlet cone 212 are shown with dotted lines, exposing the interior components of the throttle 60 such as throttle valve 64.

Throttle valve 64 includes a sealing surface 262 that is flush with and/or in sealing contact with one of the walls 222, 224, 226, or 228 of the throttle body 62. In the example shown in FIG. 2B, the sealing surface 262 is in sealing contact with the top wall 224. Thus, intake air flowing through the throttle body 62 may not flow between the sealing surface 262 and the top wall 224. Further, sealing surface 262 may maintain sealing contact with top wall 224 when the position of the throttle valve 64 is adjusted and the throttle valve 64 is displaced relative to the throttle body 62. Thus, the throttle valve 64 may be moved along the longitudinal axis 234 within the throttle body 62, and the sealing surface 262 may therefore slide relative to the top wall 224 while maintaining sealing contact therewith. Further, the throttle valve 64 may extend between the side walls 226 and 228. Specifically, throttle valve 64 may be in sealing contact with the side walls 226 and 228, such that intake air may not flow between throttle valve 64 and the side walls 226 and 228.

Throttle valve 64 may be curved and may extend inwards towards the interior and/or center of the throttle body 62. Thus, the throttle body 62 may narrow where the throttle valve 64 is positioned. Said another way, the cross-sectional flow area of the throttle body 62 may be smaller at the throttle valve 64 than at portions of the throttle body 62 not including the throttle valve 64. The throttle valve 64 may include an upstream first surface 264 facing oncoming intake gas flow. Upstream first surface 264 may be angled relative to the direction of flow of intake gasses. A downstream second surface 266 may further be included in the throttle valve 64, and may face away from oncoming intake gas flow. Downstream second surface 266 may also be angled relative to the direction of flow of intake gasses.

Specifically, the upstream first surface 264 may be orientated at approximately a first angle $\theta_1$, relative to the sealing surface 262 and/or the direction of intake gas flow in the throttle body 62, and downstream second surface 266 may be orientated at approximately a second angle $\theta_2$, relative to the sealing surface 262 and/or the direction of intake gas flow in the throttle body 62. As shown in the example of FIG. 2B, first angle $\theta_1$ may be larger than second angle $\theta_2$. Said another way, the slope of the upstream first surface 264 may be greater than the slope of the downstream second surface 266. However, it should be appreciated that in other examples, the angles $\theta_1$ and $\theta_2$ may be approximately the same, and therefore the throttle valve 64 may be relatively symmetric about an apex 268 of the throttle valve 64. In still further examples, second angle $\theta_2$ may be larger than first angle $\theta_1$, and as such the slope of the upstream first surface 264 may be less than the slope of the downstream second surface 266.

Thus, the upstream first surface 264 and the downstream second surface 266 may define the curvature of the throttle valve 64, where an apex, tip, or ridge 268 of the throttle valve 64 may be formed where the upstream first surface 264 and downstream second surface 266 meet.

The apex 268 of the throttle valve 64 may be the most inwardly projecting portion of the throttle valve 64, or said another way, the portion of the throttle valve 64 positioned furthest from the top wall 224, to which the throttle valve 64 is in sealing contact with.

Cross-sections of the throttle valve 64 taken along the plane defined by vertical axis 236 and longitudinal axis 234, or more simply, cutting plane M-M,' may be substantially the same along the lateral axis 232. Thus, apex 268, may not be a single point, but may instead extend along the width of the throttle valve 64, between the side walls 226 and 228. However, in some examples, it should be appreciated that the apex 268 may not extend between the side walls 226 and 228. Further, the apex 268 may in some examples be a single point.

Shaft 242 may be fluidically coupled to the interior of throttle valve 64. Thus, shaft 242 may provide fluidic communication between the vacuum consumption device 140 and the interior of the throttle valve 64.

As will be explained in greater detail below with reference to FIGS. 4A-4C, the throttle valve 64 may be movable along the longitudinal axis 234. Thus, the throttle valve 64 may slide relative the throttle body 62, between the downstream first end 209 and the downstream second end 211. As such, the throttle valve 64 may move in a line substantially parallel to the direction of flow of intake gasses. Said another way, the throttle valve 64 may be displaced downstream in the direction of intake gas flow, or may be displaced upstream in the opposite direction of intake gas flow. The throttle valve 64 may be displaced along the axis 234 to generate vacuum between the throttle valve 64 and an inwardly projecting flange 240 of the throttle body 62.

In the description herein, inwardly projecting flange 240 may also be referred to as aspirator fixture 240 and/or flow obstruction 240 and/or throttle fixture 240. The flange 240 may be shaped similarly to the throttle valve 64. As such the flange 240 may have a relatively flat, planar sealing surface 272, an upstream surface 274 facing oncoming intake gas flow, and a downstream surface 276 facing away from oncoming intake gas flow. The sealing surface 272 is physically coupled to and fluidically sealed to a wall of the throttle body 62 opposite the wall to which the sealing surface 262 of the throttle valve 64 is fluidically sealed to. Thus, in the example shown in FIG. 2B, the sealing surface 272 of the flange 240 is physically coupled to and in sealing contact with the bottom wall 222, since the bottom wall 222 is opposite the top wall 224. However, it should be appreciated that the orientations of the throttle valve 64 and flange 240 may be reversed. Further the throttle valve 64 and flange 240 may be positioned on opposite side walls 226 and 228 of the throttle body 62. Thus, the throttle valve 64 and flange 240 may be coupled to any of the walls 222, 224, 226, and 228 of the throttle body 62 so long as they are positioned on opposite walls and are facing on another.

Sealing surface 272 may be in sealing contact with the bottom wall 222 of the throttle body. In some examples, the flange 240 may be physically coupled to the throttle body 62 via any suitable means such as welding, ultrasonic welding, injection molding, fastening, etc. The flange 240 may be integrally formed in the throttle body 62, in some examples. As such, intake gasses may not flow between the sealing surface 272 and the bottom wall 222. Further, the flange 240 may extend between the side walls 226 and 228. Specifically, flange 240 may be in sealing contact with the side walls 226 and 228, such that intake air may not flow between flange 240 and the side walls 226 and 228.

Flange 240 may be curved and may extend inwards towards the interior and/or center of the throttle body 62. Thus, the throttle body 62 may narrow where the flange 240 is positioned. Said another way, the cross-sectional flow area of the throttle body 62 may be smaller at the flange 240 than at portions of the throttle body 62 not including the flange 240. The flange 240 may include an upstream first surface 274 facing oncoming intake gas flow. Upstream first surface 274 may be angled relative to the direction of flow of intake gasses. A downstream second surface 276 may further be included in the flange 240, and may face away from oncoming intake gas flow. Downstream second surface 276 may also be angled relative to the direction of flow of intake gasses. Thus, the upstream first surface 274 and the downstream second surface 276 may define the curvature of the flange 240, where an apex, tip, or ridge 278 of the flange 240 may be formed where the upstream first surface 274 and downstream second surface 276 meet.

Specifically, the upstream first surface 274 may be orientated at approximately a first angle $\theta_3$, relative to the sealing surface 272 and/or the direction of intake gas flow in the throttle body 62, and downstream second surface 276 may be orientated at approximately a second angle $\theta_4$, relative to the sealing surface 272 and/or the direction of intake gas flow in the throttle body 62. As shown in the example of FIG. 2B, first angle $\theta_3$ may be larger than second angle $\theta_4$. Said another way, the slope of the upstream first surface 274 may be greater than the slope of the downstream second surface 276. However, it should be appreciated that in other examples, the angles $\theta_3$ and $\theta_4$, may be approximately the same, and therefore the flange 240 may be relatively symmetric about an apex 278 of the flange 240. In still further examples, second angle $\theta_4$ may be larger than first angle $\theta_3$, and as such the slope of the upstream first surface 274 may be less than the slope of the downstream second surface 276.

The apex 278 of the flange 240 may be the most inwardly projecting portion of the flange 240, or said another way, the portion of the flange 240 positioned furthest from the bottom wall 222, to which flange 240 is coupled.

Cross-sections of the flange 240 taken along the plane defined by vertical axis 236 and longitudinal axis 234, or more simply, cutting plane M-M,' may be substantially the same along the lateral axis 232. Thus, apex 278, may not be a single point, but may instead extend along the width of the throttle valve 64, between the side walls 226 and 228. However, in some examples, it should be appreciated that the apex 278 may not extend between the side walls 226 and 228. Further, the apex 278 may in some examples be a single point.

As described above, the flange 240 may be physically coupled to the throttle body 62. As such, the position of the flange 240 may be fixed relative to the throttle body 62. In some examples, the flange 240 may be positioned more proximate the downstream first end 209 than the downstream second end 211. Thus, the apex 278 may be positioned more proximate the downstream first end 209 than the downstream second end 211. However, in other examples, such as the example shown in FIG. 2B, the flange 240 may positioned more proximate the downstream end 209 than the downstream first end 209. Thus, the apex 279 as shown in FIG. 2B may be more proximate the downstream second end 211 than the downstream first end 209.

As will be explained in greater detail below with reference to FIGS. 4A-4C, by sliding the throttle valve 64 along the longitudinal axis 234, the distance between the throttle valve 64 and the flange 240 may be varied. As the throttle valve 64 and flange 240 are brought closer together by moving the throttle valve 64, the narrowing of the throttle body 62 may increase. Specifically, as the apex 268 of the throttle valve 64 is brought closer to the apex 278 of the flange 240, the cross-sectional flow area defined between the apex 268 and apex 278 may decrease. Thus, as the distance between the throttle valve 64 and flange 240 decreases, a narrowing of the throttle body 62 increases, and a cross-sectional flow area of the throttle body decreases. Therefore, by moving the throttle valve 64 towards the flange 240, a Venturi effect may be created between the apex 268 of the throttle valve 64 and the apex 278 of the flange 240. Thus, a vacuum may be generated between the ridges 268 and 278 which may be used to draw in gasses from the vacuum consumption device 140. Specifically, as explained in greater detail below with reference to FIG. 3, gasses may be routed from the vacuum consumption device 140 to a hollow passage (e.g., interior passage 72 shown in FIG. 1) included within the throttle valve 64. Gasses from the vacuum consumption device 140 may then flow out of the throttle valve 64 via an opening (e.g., opening 68 shown in FIG. 1) formed at the apex 268 of the throttle valve 64.

Figure 3:
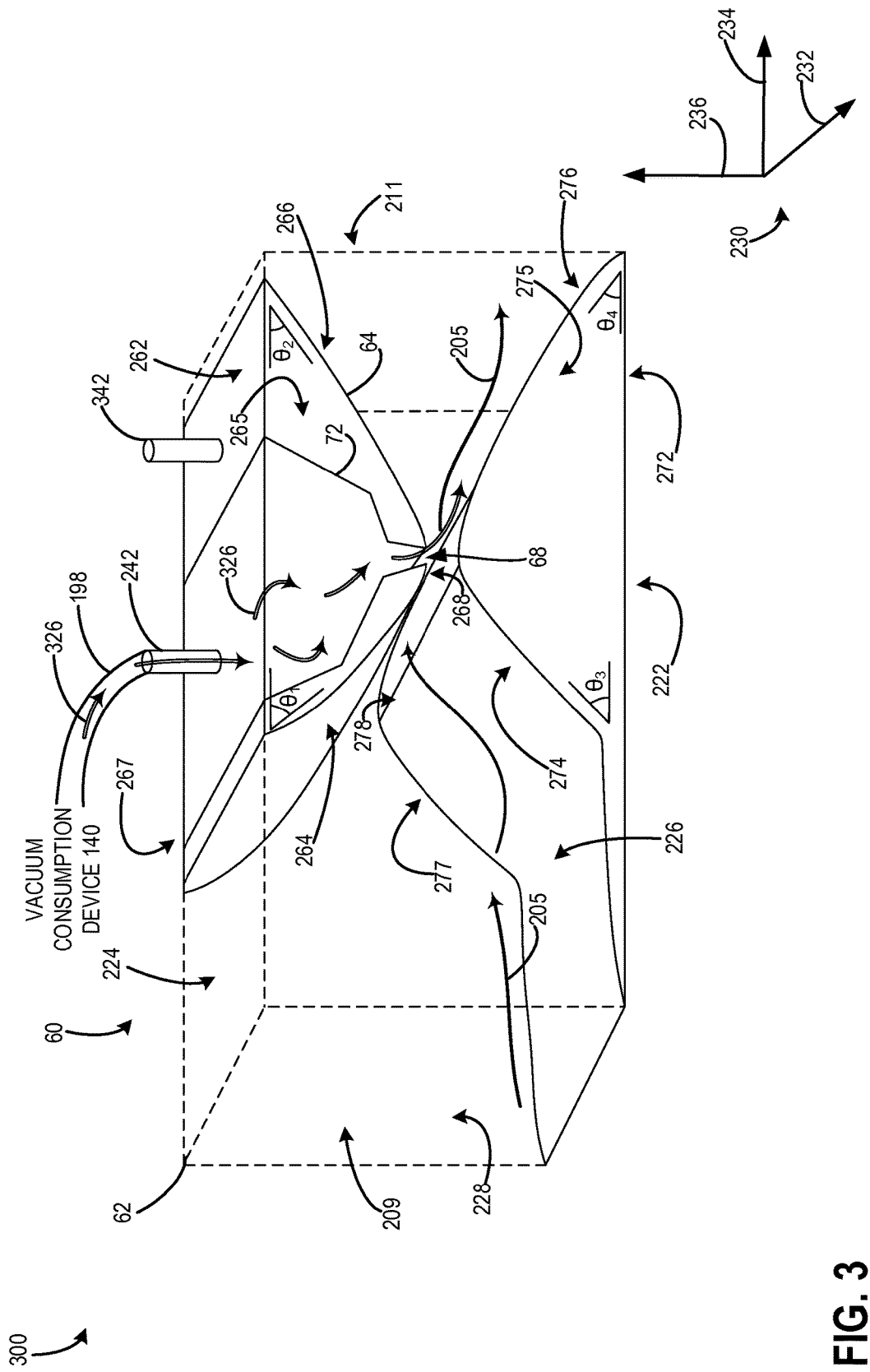
FIG. 3 depicts an interior side perspective view of the throttle shown in FIGS. 2A and 2B.

Turning now to FIG. 3, it shows an internal side perspective view 300 of the throttle body 62. Components of the throttle body 62 already introduced and/or described in FIGS. 1-2B may not be reintroduced or described again in the description of FIG. 3. Specifically FIG. 3 shows the internal structure of the throttle valve 64, including the hollow interior passage 72. Hollow interior passage 72 may fluidically couple the shaft 242 to the opening 68. As such, gasses from the vacuum consumption device 140 may flow into the interior passage 72 via the shaft 242, and may then exit the interior passage 72 and throttle valve 62 via the opening 68. Interior passage 72 may define a volume of the throttle valve 64. Portions of the throttle valve 64 not including the interior passage 72 may not be hollow. Shaft 242 may extend into the interior of the passage 72 from outside the throttle body 62.

A front side surface 265 of the throttle valve 64 may be in sealing contact with the front side wall 226 of the throttle body 62. Further a back side surface 267 of the throttle valve 64 may be in sealing contact with the back side wall 228 of the throttle body 62. Thus, as explained above the throttle valve 64 may extend between the side walls 226 and 228.

Similarly, a front side surface 275 of the flange 240 may be in sealing contact with the front side wall 226 of the throttle body 62. Further a back side surface 277 of the flange 240 may be in sealing contact with the back side wall 228 of the throttle body 62. Thus, as explained above the flange 240 may extend between the side walls 226 and 228.

The opening 68 may be formed at the apex 268 of the throttle valve 64. However, it should be appreciated that in other examples, the opening 68 may be formed at another position on either the upstream first surface 264 or the downstream second surface 266. The opening 68 may therefore extend from the front side surface 265 to the back side surface 267 of the throttle valve 64. Said another way, walls defining the interior passage 72 may converge with exterior walls of the throttle valve 64 forming the first surface 264 and second surface 266 to form the opening. Thus, the opening 68, may be a slit in the throttle valve 64 formed by the convergence of the hollow interior passage 72 with exterior walls of the throttle valve 64, for examples first and second surfaces 264 and 266, respectively. The opening 68 may extend along the width of the throttle valve 64. However, in other examples, it should be appreciated that the opening may not extend between the side surfaces 265 and 267. In still further examples, the opening may comprise a single aperture or plurality of apertures. The shape, size, and/or distribution of the apertures may be varied. For example, the apertures may be circular, rectangular, triangular, geometric, or non-geometric.

As can be seen in the example of FIG. 3, intake gas flow may be constricted as it flows between the throttle valve 64 and the flange 240. Intake gasses flow from left to right in FIG. 3 as shown by the intake gas flow arrows 205. Thus, intake gasses flow over the first surface 274 and apex 278 of the flange 240, and under the first surface 264 and apex 268 of the throttle valve 64. Due to the narrowing of the throttle body 62 between the flange 240 and throttle valve 64, vacuum may be generated at the opening 68 of the throttle valve 64 which may be used to draw in gasses from the vacuum consumption device as shown by flow arrows 326. As described below with reference to FIGS. 4A-4C, the position of throttle valve 64 may be adjusted to vary the amount of vacuum generated at the opening 68 of the throttle valve 64. A motor may be physically coupled to the throttle valve 64 via shaft 342 and as such, the motor may move the throttle valve 64 along the longitudinal axis 234 as explained in greater detail below with reference to FIGS. 4A-4C. Shaft 342 may be physically coupled to the throttle valve 64, and may extend out to the exterior of the throttle body 62. The shaft may in some example be coupled to the portion of the throttle valve 64 not including the hollow interior passage 72.

Turning now to FIGS. 4A-4C, they show example positions to which the throttle valve 64 may be adjusted. Thus, FIGS. 4A-4C, show the relative positioning of the throttle valve 64 within throttle body 62, as the throttle valve 64 is adjusted to different example positions. FIGS. 4A-4C show cross-sectional views of throttle valve 64 positioned within throttle body 62, where the cross-sectional plane is taken along line M-M' of FIGS. 2A-2B. FIG. 4A, shows the throttle valve 64 in an open first position. FIG. 4C shows the throttle valve 64 in a closed second position, and FIG. 4B shows the throttle valve in an intermediate third position, the third position being a position between the open first position and the closed second position. More air may flow through throttle body 62, when the throttle valve 64 is in the intermediate third position than in the closed second position, and more air may flow through throttle body 62 when the throttle valve 64 is in the open first position than in the intermediate third position. Thus, airflow through the throttle 60 may increase with increasing deflection towards the open first position, away from the closed second position. Note that components previously introduced in FIGS. 1-3 are numbered similarly in FIGS. 4A-4C, and may not be reintroduced.

Thus, in FIGS. 4A-4C, throttle valve 64 may be shown displaced along the longitudinal axis 234 in different positions. As described above with reference to FIG. 2B and FIG. 3, throttle valve 64 may slide relative to the throttle body 62 and flange 240 along longitudinal axis 234. As such, the distance between the throttle valve 64 and the flange 240, may vary depending on the position of the throttle valve 64. Specifically, when adjusting the throttle 60 to a more open position, the throttle valve 64 may be moved closer to the downstream first end 209 of the throttle body 62, and away from the downstream second end 211 of the throttle body 62 and flange 240. In this way, an opening in the throttle 60 formed between the throttle valve 64 and flange 240 may be increased, and airflow there-through may correspondingly increase. Further, when adjusting the throttle 60 to a more closed position, the throttle valve 64 may be moved closer to the downstream second end 211 of the throttle body 62 and flange 240, and away from the downstream first end 209 of the throttle body 62. In this way, an opening in the throttle 60 formed between the throttle valve 64 and flange 240 may be reduced, and airflow there-through may correspondingly decrease. As explained above with reference to FIGS. 2B and 3, as the throttle 60 is adjusted towards the more closed position, a Venturi effect created between the throttle valve 64 and the flange 240 may increase. As such, a larger vacuum may be generated between the valve 64 and the flange 240, as the throttle 60 is adjusted towards the more closed position.

Since airflow through the throttle body 62 may be substantially parallel to longitudinal axis 234, movement of the throttle valve 64 may be substantially parallel to intake gas flow in the throttle body 62. Airflow through the throttle body 62 is shown flowing from left to right in FIGS. 4A-4C. As such, moving the throttle valve 64 downstream may refer to moving the throttle valve 64 in the same or similar direction as intake gas flow (from left to right in FIGS. 4A-4C). Conversely, moving the throttle valve 64 upstream may refer to moving the throttle valve 64 in the opposite direction of intake gas flow (from right to left in FIGS. 4A-4C). As such, when the throttle valve 64 is moved towards a more closed position, the throttle valve 64 may be displaced in a direction approximately exactly concurrent the direction of flow of intake gasses in the throttle body 62. Conversely, when the throttle valve 64 is moved towards a more open position, the throttle valve 64 may be displaced in a direction approximately exactly opposite or opposing with the direction of flow of intake gasses in the throttle body 62 (e.g., downstream). Since the flange 240 is shown positioned more proximate the downstream second end 211 than the downstream first end 209 of the throttle body 62, as the throttle valve 64 is displaced downstream, the throttle valve 64 may be moved closer to the flange 240. Conversely, as the throttle valve 64 is moved upstream, the distance between the throttle valve 64 and the flange 240 may increase.

The position of the throttle valve 64 may be adjusted by a motor 81. Specifically, motor 81 may be physically coupled to throttle valve 64 for moving the throttle valve 64 within the throttle body 62. Motor 81 may be in electrical communication with controller 12, and may adjust the position of the throttle valve 64 based on signals received from the controller 12. Specifically in response to increase in demand for vacuum from the vacuum consumption device, the controller 12 may send signals to the motor 81 for adjusting the position of the throttle valve 64 to a more closed position to increase an amount of vacuum generated at the tip 268 of the throttle valve.

Motor 81 may be any suitable actuator such as hydraulic, electric, pneumatic, electromechanical, etc. Further, motor 81 may be physically coupled to throttle valve 64 via shaft 342 and/or actuator rod 426. Thus, motor 81 may be a linear actuator, and may displace the throttle valve 64 along the longitudinal axis 234, upstream and downstream within the throttle body 62. In some examples, the motor 81 may be directly physically coupled to actuator rod 426, and actuator rod 426 may in turn be directly physically coupled to shaft 342, which may in turn be directly physically coupled to throttle valve 64. The actuator rod 426 may in some examples comprise a plunger or piston that is movable along the longitudinal axis 234. As such, as the motor 81 displaced the actuator rod 426 along the horizontal axis, the throttle valve 64 may be displaced as well since it may be physically coupled to the rod 426 via shaft 342. However, in other examples, such as the examples shown in FIGS. 4A-4C, the actuator rod 426 may be threaded and rotation of the actuator rod 426 may in turn cause a displacement of the shaft 342 and throttle valve 64 along the longitudinal axis 234. Thus, rotational motion generated by the motor 81 may be converted in linear motion of the throttle valve 64. Further, it should be appreciated that other examples of linear actuation of the throttle valve 64 by the motor 81 are possible. Further, in some examples, motor 81 may be directly physically coupled to shaft 342, and rod 426 may not be included.

FIG. 4A shows an embodiment 400, where throttle valve 64 is in the open first position. Airflow through the throttle body 62 may be greater with the throttle valve 64 in the open first position than any other throttle position. Thus, the position of the throttle valve 64 shown in FIG. 4A may be referred to as a fully open position. Throttle valve 64 may not overlap with the flange 240. More precisely, a given cross-section of the throttle body 62 taken along the vertical axis 236, may not include both the flange 240 and throttle valve 64, when the throttle valve is adjusted to the open first position. Said another way, no portion of the throttle valve 64 may be positioned over any portion of the flange 240. However, in other examples, some overlap between the throttle valve 64 and the flange 240 may exist in the open first position. As such, a narrowing of the throttle body 62 may be less in the open first position, than more closed positions, and airflow through the throttle body 62 may be relatively unobstructed.

FIG. 4B shows an embodiment 425, where the throttle valve 64 is displaced downstream in the throttle body 62 along the longitudinal axis 234, relative to the open first position shown in FIG. 4A to an intermediate third position. As such airflow through the throttle body 62 may be less in the third position than in the open first position. However, an amount of vacuum generated at the tip 268 of the throttle valve 64 may be greater at the third position than the open first position. Thus, an amount of gasses drawn from the vacuum consumption device 140 into the throttle body 62 may be greater in the third position than the open first position as shown by the increased number of flow arrows 326 in FIG. 4B relative to FIG. 4A. In the intermediate third position, the throttle valve 64 may overlap with the flange 240. That is, a given cross-section of the throttle body 62 taken along the vertical axis 236, may include both the flange 240 and throttle valve 64, when the throttle valve is adjusted to the intermediate third position. Said another way, portions of the throttle valve 64 may be positioned over portions of the flange 240. However, in other examples, the throttle valve 64 may not overlap with the flange 240 in the intermediate third position.

FIG. 4C shows an embodiment 450, where the throttle valve 64 is displaced downstream in the throttle body 62 along the longitudinal axis 234, relative to the open first position and intermediate third position shown in FIGS. 4A and 4B, to the closed second position. As such airflow through the throttle body 62 may be less in the closed second position than in the open first position and intermediate third position. However, an amount of vacuum generated at the tip 268 of the throttle valve 64 may be greater at closed second position than the open first position and intermediate third position. Thus, an amount of gasses drawn from the vacuum consumption device 140 into the throttle body 62 may be greater in the closed second position than the open first position and intermediate third position as shown by the increased number of flow arrows 326 in FIG. 4C relative to FIGS. 4A and 4B.

In the closed second position, the throttle valve 64 may fully overlap with the flange 240. That is, substantially all cross-sections of the throttle valve 64 taken along the vertical axis 236, may include both the flange 240 and throttle valve 64, when the throttle valve is adjusted to the closed second position. Said another way, the throttle valve 64 may be positioned directly over the flange 240, so that the tip 268 of the throttle valve 64, and the tip 278 of the flange 240 are aligned with one another along the vertical axis 236.

As shown in FIG. 4C, the tips 268 and 278 may be separated from one another may a narrow space in the closed second position, so that gasses from the vacuum consumption device 140 may flow out of the opening 68, and into the throttle body 62. Thus, the throttle valve 64 and flange 240 may not be in physical contact with one another in the closed second position, so that some amount of air may continue to flow through the throttle body 62 to generate vacuum as it flows through the constriction formed by the throttle valve 64 and flange 240 in the closed second position.

However, it should be appreciated that in other examples, the throttle valve 64 and flange 240 may be in sealing contact with one another when the throttle valve 64 is adjusted to the closed second position. In such examples, airflow through the throttle body 62 may be substantially zero. Thus, in some examples, the throttle valve 64 may be adjusted to a fully closed position, to cut off airflow to an intake manifold (e.g., intake manifold 44 shown in FIG. 1).

Thus, as the throttle valve 64 is adjusted towards a more closed position, more proximate the flange 240, airflow through the throttle body 62 may decrease, vacuum generated between the throttle valve 64 and the flange 240 may increase, and an amount of gasses flowing from the vacuum consumption device 140 and into the throttle body 62 via interior passage 72 and opening 68 may increase. Conversely, as the throttle valve 64 is adjusted towards a more open position, further away from the flange 240, airflow through the throttle body 62 may increase, vacuum generated between the throttle valve 64 and the flange 240 may decrease, and an amount of gasses flowing from the vacuum consumption device 140 and into the throttle body 62 via interior passage 72 and opening 68 may decrease. In this way, airflow to the intake manifold may be adjusted by adjusting the position of the throttle valve 64. Further an amount of vacuum applied to the vacuum consumption device 140 may be adjusted by adjusting the position of the throttle valve 64.

In this way, a throttle coupled in an intake conduit of an engine intake may comprise a throttle body, a slidable throttle valve included within the throttle body, the throttle valve comprising a hollow passage coupling a vacuum consumption device to an interior of the throttle body, and an inwardly projecting flange coupled within the throttle body. The throttle body of the above throttle may be rectangular and may include four substantially planar walls: two side walls, a top wall, and a bottom wall. A cross-sectional area of the throttle body may be greater than that of the intake conduit. The inwardly projecting flange may be physically coupled to, and in sealing contact with an interior surface of the bottom wall, where the flange may extend between and may be in sealing contact with interior surfaces of the two side walls. The throttle valve of any one or combination of the above embodiments of the throttle, may be physically coupled to, and in sealing contact with an interior surface of the top wall, and where the throttle valve may extend between and may be in sealing contact with, interior surfaces of the two side walls. The inwardly projecting flange of any one or combination of the above embodiments of the throttle, may be positioned more proximate a downstream end of the throttle body than an upstream end of the throttle body. The throttle of any one or combination of the above embodiments may further comprise, an inlet cone coupling an upstream portion of the intake conduit to an upstream end of the throttle body, where a first end of the inlet cone may be coupled to the upstream portion of the intake conduit, and where a second end of the inlet cone may be coupled to the upstream end of the throttle body, and where a cross-sectional area of the inlet cone may be greater at the second end than the first end. The throttle of any one or combination of the above embodiments may further comprise, an outlet cone coupling a downstream portion of the intake conduit to a downstream end of the throttle body, where a first end of the outlet cone may be coupled to the downstream end of the throttle body, and where a second end of the outlet cone may be coupled to the intake conduit, and where a cross-sectional area of the outlet cone may be greater at the first end than the second end. The inwardly projecting flange and throttle valve of any one or combination of the above embodiments of the throttle, may each comprise respective upstream first surfaces facing oncoming intake gas flow, the first surfaces orientated at respective first angles with respect to a direction of flow of oncoming intake gasses, and where the inwardly projecting flange and throttle valve may each comprise respective downstream second surfaces facing away from oncoming intake gas flow, the second surfaces orientated at respective second angles with respect to the flow direction of oncoming intake gasses, where the second angles may be less than the respective first angles. The throttle of any one or combination of the above embodiments, wherein the throttle valve may be movable relative to the flange along a longitudinal axis of the throttle body between an open first position and a closed second position, and where an opening in the throttle body formed between the throttle valve and the flange may increase with increasing deflection of the throttle valve towards the open first position, away from the closed second position. The throttle of any one or combination of the above embodiments further comprising, a motor physically coupled to the throttle body for adjusting the throttle valve between the first and second positions. The throttle of any one or combination of the above embodiments, wherein the throttle valve includes an aperture formed at an apex of the throttle valve by the hollow passage, and where a Venturi effect may be created at the apex, and where a magnitude of the Venturi effect may increase for decreases in a distance between the throttle valve the flange. The throttle of claim 1, wherein the vacuum consumption device is one of a brake booster, a fuel vapor canister, and a vacuum actuated valve.

In another representation, a system may comprise an engine including an intake conduit, a throttle body included in the engine intake, the throttle body comprising a throttle valve slidable along an axis substantially parallel to a direction of intake gas flow in the throttle body between an open first position and a closed second position, the throttle valve comprising a hollow passage fluidically coupling a vacuum consumption device to an interior of the throttle body, an inwardly projecting flow obstruction coupled within the throttle body, and a controller with computer-readable instruction stored in non-transitory memory for: in response to increases in vacuum demand, adjusting the throttle valve towards a more closed position to increase an amount of vacuum generated at an aperture of the throttle valve formed by the hollow passage at an inwardly extending tip of the throttle valve. The throttle body of the above system may be formed between the throttle valve and the flow obstruction and therefore an amount of airflow through the intake conduit decreases, and an amount of vacuum generated at the aperture increases, as the throttle valve is adjusted towards the closed second position. The system of any one or combination of the above embodiments may further comprise, a motor in electrical communication with the controller, the motor physically coupled to the throttle valve, and where the motor may adjust the position of the throttle valve based on signals received from the controller.

The system of any one or combination of the above embodiments, wherein a slope of an upstream first surface of the throttle valve facing oncoming intake gas flow may be greater than a slope of a downstream second surface of the throttle valve facing away from oncoming intake gas flow. The system of any one or combination of the above embodiment, wherein a slope of an upstream first surface of the flow obstruction facing oncoming intake gas flow may be greater than a slope of a downstream second surface of the flow obstruction facing away from oncoming intake gas flow.

Turning now to FIG. 5, it shows an example routine 500 that a controller (e.g., controller 12 shown in FIG. 1) may perform to adjust a position of a throttle valve (e.g., throttle valve 64 shown in FIGS. 1, and 2B-4D) within a throttle (e.g., throttle 60 shown in FIGS. 1-4D) in response to vacuum demand from a vacuum consumption device (e.g., vacuum consumption device 140 shown in FIGS. 1-4D), coupled to the throttle valve. Additionally, the controller may modify one or more engine operating parameters responsive to the adjusting of the throttle valve in order to maintain engine torque.

As explained above with reference to FIGS. 2B-4C, the throttle valve may be movable relative to a throttle body (e.g., throttle body 62 shown in FIGS. 1-4C) of the throttle. Said another way, the throttle valve may be slidable within the throttle. Specifically, the throttle valve may be displaced relative to the throttle body along a longitudinal axis of the throttle body. Thus, the throttle valve may be displaced along an axis substantially parallel to a direction of intake gas flow in the throttle. As such, the throttle valve may be moved upstream and/or downstream within the throttle relative to intake gas flow.

Further, the throttle valve may be displaced so that a distance between the throttle valve and a flow obstruction (e.g., flange 240 shown in FIGS. 2B-4C) is varied. Specifically, the throttle valve may be moved towards or closer to the flow obstruction when closing the throttle, and may be moved away from the flow obstruction when opening the throttle. As explained above with reference to FIGS. 4A-4C, the throttle valve may be adjusted to an open first position where the throttle valve is positioned a larger first distance from the flow obstruction and flow through the throttle is relatively unrestricted and a closed second position where the throttle valve is positioned a shorter first distance from the flow obstruction and flow through the throttle is restricted and/or substantially zero. In some examples, the throttle valve may be positioned directly over the flow obstruction in the closed second position so that an opening formed between the throttle valve and the flow obstruction is minimized.

Further, the throttle may be adjusted to any position between the first and second positions. Thus, closing the throttle may refer to moving the throttle valve towards the closed second position away from the open first position and decreasing the opening formed between the throttle valve and the flow obstruction, and decreasing intake flow to an intake manifold (e.g., intake manifold 44 shown in FIG. 1) Conversely, opening the throttle may refer to moving the throttle valve towards the open first position away from the closed second position and increasing the opening formed between the throttle valve and the flow obstruction and increasing intake flow to the intake manifold.

An actuator (e.g., motor 81 shown in FIGS. 4A-4C) may be in electrical communication with the controller for adjusting the position of the throttle valve based on signals received from the controller. Thus, movement of the throttle valve may be performed by the actuator.

At 502, engine operating conditions may be determined. Engine operating conditions may include engine speed, torque demand, combustion air-fuel ratio, boost pressure, manifold absolute pressure, mass airflow, engine temperature, etc. Once engine operating conditions are estimated at 502, routine 500 may proceed to 504 which comprises determining an initial throttle position based on the engine operating conditions determined at 502. For example, as the operator torque demand increases, the throttle may be moved to a more open position to increase intake airflow. As another example, if combustion air-fuel ratio is determined to be leaner than a desired stoichiometric value, the throttle may be set to a more closed position to reduce intake airflow. In yet another example, if engine idling conditions are met, the throttle may be moved to a fully closed position.

At 506, routine 500 may determine if vacuum is desired by the vacuum consumption device coupled to the throttle. In one example, vacuum may be demanded when the vacuum consumption device is actuated. In another example, if the vacuum consumption device includes a vacuum reservoir, it may be determined if the vacuum requirement of the device exceeds the vacuum available in the reservoir. If it is determined that vacuum is not desired, at 512, the initial throttle position may be maintained and the routine ends. The throttle position may then continue to be adjusted based on engine operating conditions only, and not based on vacuum requirement of the vacuum consumption device.

On the other hand, if it is determined that the vacuum consumption device requires vacuum assistance at 508, routine 500 continue to 508 which may comprise assessing whether engine conditions allow a change in throttle position. In particular, it may be determined if the engine conditions permit a change in the throttle position towards a more closed position where intake airflow to the engine is reduced. For example, there may be engine conditions where changes in throttle position may be tolerated without affecting engine performance. In addition, there may be conditions where the throttle position is limited or constrained. For example, if the vehicle is accelerating on a highway and engine speed is higher than a threshold, the throttle may be positioned in a mostly open or fully open position to allow higher airflow than when the throttle is in a more closed position. In this situation, the throttle position may not be moved to a more closed position for generating vacuum as it would adversely affect engine torque output and performance. Thus, if it determined that the position of the throttle cannot be adjusted, at 510, the controller maintains the throttle at its initial position and the routine ends. The throttle position may then continue to be adjusted based on engine operating conditions only, and not based on the vacuum requirement of the vacuum consumption device.

However, if it is assessed that engine conditions permit a change in throttle position, and more specifically the conditions permit a decrease in throttle position at 508, then routine 500 may continue to 514 which comprises adjusting the throttle towards a more closed position. The adjustment to the position of the throttle may depend on the level of vacuum desired by the vacuum consumption device. For example, if a higher level of vacuum is desired, the throttle may be moved further towards a fully closed position (e.g., the throttle may be fully closed). Said another way, an amount that the throttle valve is displaced towards the fully closed position may be proportional to an amount of vacuum demand. On the other hand, if a lower level of vacuum is desired, the controller may adjust the throttle to a slightly closed or partially closed position. Thus, as the level of desired vacuum from the vacuum consumption device increases, the throttle may be moved towards a more closed position. In one example, if it is determined at 508 that the throttle is already in a closed position during engine idling, the throttle position may be retained, at 514, without further adjustments.

Next, at 516, vacuum may be generated at the throttle valve as intake air flows through an interior of the throttle between the throttle valve and the flow obstruction. Thus, the routine 500 at 516 may include flowing intake air through between the throttle valve and the flow obstruction through the throttle. As elaborated previously, a venturi effect may be created by the flow of intake air through a constricted passage. Specifically, as the throttle valve is moved towards the closed second position, the flow area formed between the throttle valve and the flow obstruction may decrease. In this way, a Venturi effect may be created at a tip (e.g., apex 268 shown in FIGS. 2B-4C) of the throttle valve, and vacuum may be generated between the throttle valve and the flow obstruction.

At 518, the generated vacuum may be applied to the vacuum consumption device to enable the device to be actuated or operated. For example, where the vacuum consumption device is a brake booster, the generated vacuum may be applied to enable wheel braking. As another example, where the vacuum consumption device is a fuel vapor canister, the generated vacuum may be applied to enable canister purging to the engine intake. As yet another example, where the vacuum consumption device is a vacuum actuated valve, the generated vacuum may be applied to enable valve actuation. As vacuum is applied to the vacuum consumption device, air is received from the vacuum consumption device at the throttle valve. As described earlier, air may flow from the vacuum consumption device, through a conduit (e.g., conduit 198 shown in FIGS. 1-6) coupled to a hollow shaft (e.g., hollow shaft 242 shown in FIGS. 2A-4C) of the throttle valve and out through an opening (e.g., opening 68 shown in FIGS. 1, and 3-4C) of the throttle valve into the throttle body. Thus, the air from the vacuum consumption device is received at the throttle, facilitating air flow control.

At 520, one or both of fuel injection amount and injection timing may be adjusted based on the throttle position, and existing airflow, to maintain engine torque. Existing airflow may be a combination of fresh intake air that flows past the perforated edge of the throttle and air flowing from the vacuum consumption device through the throttle valve into the intake. In one example, the fuel injection amount and/or timing may be adjusted to maintain a cylinder air-fuel ratio at or close to a desired ratio, such as stoichiometry. In another example, fuel injection amount and/or timing may be modified to maintain engine combustion for torque. In yet another example, one or both of fuel injection timing and fuel injection amount may be varied to maintain each of engine torque and a stoichiometric air fuel ratio.

In one example, during engine idling conditions, as the throttle is adjusted to a fully closed position, airflow via the throttle is reduced while airflow from the vacuum consumption device into the intake manifold is increased. Based on the total airflow being smaller, a fuel injection amount may be decreased to maintain air-fuel ratio. The fuel injection amount may be reduced by decreasing a pulse width of the fuel injection. Further, fuel injection timing may be advanced or retarded based on engine torque requirement.

At 522, one or more engine operating parameters may be varied in response to the adjustment of throttle position and the flowing of air from the vacuum consumption device. Engine operating parameters may be modified to maintain engine torque output. For example, boost pressure may be increased at 524 as the throttle valve is moved to a more closed position at 514. To increase boost pressure, a wastegate (e.g., wastegate 168 shown in FIG. 1) coupled across an exhaust turbine (e.g., turbine 164 shown in FIG. 1) may be adjusted to a more closed position to force a larger quantity of exhaust gases through the exhaust turbine. By increasing boost pressure in the boost chamber within the intake, a drop in engine torque resulting from the throttle closing can be compensated for.

Engine torque output may also be maintained by decreasing a rate of exhaust gas recirculation (EGR) at 526. As the throttle is moved to a more closed position, an EGR valve in an EGR passage coupling the engine exhaust to the engine intake may be adjusted to a more closed position to allow a smaller proportion of exhaust gases to be recirculated into the intake. Thus, by reducing the flow of exhaust residuals into the intake, engine dilution is reduced, and the aircharge within engine cylinders may comprise a larger proportion of fresh intake air allowing the engine to maintain its torque output.

At 528, valve timing may be adjusted to retain engine torque levels. In one example, the intake valve may be held open for a longer duration to allow more fresh air into the cylinder. In another example, exhaust valve timing may be modified to reduce the proportion of internal EGR within the cylinder. Further still, each of intake an exhaust valve timing may be adjusted to vary an amount of valve overlap. For example, valve overlap may be reduced to improve engine torque output.

It will be appreciated that the controller may select one or more of the various engine operating parameters described above to maintain torque based on existing operating conditions. For example, during a first condition, where the vehicle is operating under steady state driving conditions when the throttle position is modified to generate vacuum, the controller may only increase boost pressure but not reduce EGR to maintain engine torque output. During a second condition, as the throttle is closed, boost pressure may be maintained while EGR dilution is reduced. In another example, during a third condition, each of internal and external EGR reduction may be used. For example, an exhaust valve may be closed relatively early to reduce internal EGR within the cylinder and an opening of the EGR valve for external EGR may be decreased simultaneously to reduce external EGR into the intake. During a fourth condition, as the throttle position is closed, the controller may reduce EGR while also increasing boost pressure. Still other combinations may be possible.

Next at 530, routine 500 may comprise determining that sufficient vacuum has been generated to meet the demand of the vacuum consumption device. If it is determined that the demand has not been met at 530, routine 500 may proceed to 534 which comprises maintaining the throttle position in the more closed position set at 514 and continuing to generate vacuum for a longer duration. In another example, if the throttle is not fully closed at 514, the throttle may be moved to a fully closed position to generate more vacuum, if engine operating conditions allow this adjustment. Routine 500 may then return to 530 to determine if vacuum demand has been met.

If it is determined that sufficient vacuum has been generated for the vacuum consumption device at 530, routine 500 may then proceed to 532 which comprises adjusting the throttle towards a more open position. Alternatively, the throttle may be moved to a position based only on the existing engine operating conditions.

In this way, a position of the throttle may be adjusted by the controller in response to a vacuum demand from the vacuum consumption device. As the demand for vacuum from the vacuum consumption device increases, the throttle may be moved to a more closed position. Further, changes in engine torque that occur from the decrease in throttle opening and the flowing of air from the vacuum consumption device may be counteracted by varying one or more of engine operating parameters such as boost pressure, valve timing and EGR. Thus, boost pressure may be increased, EGR flow may be reduced and valve timings may be altered to maintain engine torque output. Further, one or both of fuel injection amount and injection timing may be modified to maintain engine combustion at or around stoichiometry.

Turning now to FIG. 6, it illustrates map 600 depicting an example intake throttle position adjustment based on a demand for vacuum from a brake booster and modifications in engine operating parameters in response to the throttle position adjustment. Map 600 shows brake pedal position at plot 602, brake booster vacuum level at plot 604, boost pressure at plot 606, a wastegate position at 608, EGR valve position at plot 610, a position of a throttle (e.g., throttle 60 shown in FIGS. 1, and 2B-4C) at plot 612, engine torque output at plot 614, and vehicle speed, Vs, at plot 614. All the above are plotted against time on the X-axis. Line 607 represents a minimum threshold vacuum in the brake booster reservoir.

Prior to time $t_1$, a vehicle may be moving in a steady state condition with moderate speed. The throttle may be at a partly open position to allow adequate airflow into the intake, the throttle opening based on the operating conditions such as the vehicle speed and the operator demanded torque. Further, engine torque output and boost pressure may be adjusted to moderate levels based on the operating conditions. In the depicted example, the engine is operating with the wastegate at a mostly closed position to provide the demanded boost pressure. Brake pedal is in a released (or "off") position and vacuum in the brake booster reservoir is sufficient, as indicated by the brake booster vacuum being higher than vacuum threshold 607. In addition, prior to $t_1$, based on engine operating conditions such as engine speed and load conditions, the EGR valve may be held in a more open position to permit a higher flow of exhaust residuals into the intake, to improve engine fuel economy and reduce NOx emissions.

At $t_1$, the brake pedal may be applied by the operator upon which vacuum in the brake booster reservoir is consumed to enable wheel braking. As brake application continues, the quantity of vacuum in the reservoir reduces. However, the level of vacuum within the reservoir remains above threshold 607. Due to brake application, engine torque output and vehicle speed decrease. In addition, to reduce the engine torque output and vehicle speed, the throttle may be adjusted to a more closed position. The wastegate may also be moved to a more open position to enable boost pressure to be reduced.

At $t_2$, the brake pedal is released and the vehicle resumes steady state travel conditions similar to those prior to $t_1$. Based on the prevalent operating conditions, the throttle is moved towards a more open position to increase engine torque output. In addition, boost pressure is increased by moving the wastegate to a more closed position. As a result, vehicle speed may increase.

At $t_3$, the brake pedal may be applied again. Brake pedal application at $t_3$ may be more forceful (e.g., depressed further and faster) as compared to the brake pedal application at $t_1$. As a result, a steeper drop in vacuum levels within the brake booster reservoir is observed. In particular, the harder brake pedal application at $t_3$ may result in vacuum depletion to below threshold level 607 at the reservoir. As the brakes are applied, between $t_3$ and $t_4$, vehicle speed and engine torque output fall sharply. The throttle may be moved to a more closed position and the wastegate may be moved to a more open position, to reduce boost pressure and engine output. Serendipitously, the throttle closing also enables vacuum to be produced at the throttle, which may be applied to the brake booster during the brake application. In particular, as the throttle is moved to the more closed (e.g., fully closed) position, air flowing past the constriction between the throttle and the intake passage results in a venturi effect and vacuum is generated at a tip (e.g., tip 268 shown in FIGS. 2B-4C) of a throttle valve (e.g., throttle valve 64 shown in FIGS. 1, and 2B-4C) of the throttle.

At $t_4$, the brake booster vacuum level falls below threshold 607. In response to drop, a demand for additional vacuum may be received by the controller. The brakes may be released at $t_4$ and the vehicle may travel at a slower speed between $t_4$ and $t_5$. However, due to the vacuum demand, the throttle may be adjusted to a fully closed position and may be maintained at the closed position to generate vacuum via intake airflow past the tip of the throttle valve. The generated vacuum is applied to the brake booster until vacuum in the brake booster reservoir is above threshold 607. In an alternate example, the controller may maintain the throttle at the more closed position existing before $t_4$ until the vacuum level in the reservoir is above the threshold. Between $t_4$ and $t_5$, the vacuum level in the reservoir may rise towards threshold 607, and the throttle may be moved to a nominal open position based on existing engine operating conditions. While the throttle is held closed for vacuum generation, the wastegate may be moved to a more closed position to increase boost pressure and prevent a decrease in engine torque output. Additionally, the EGR valve may be adjusted to a more closed position to reduce the flow of exhaust gas residuals into the intake and assist in maintaining engine torque.

At $t_5$, while vacuum is being generated at the throttle, the operator may apply an accelerator pedal to sharply increase vehicle speed. For example, the operator may be accelerating on a highway to pass other vehicles and may fully depress the accelerator pedal. In response to accelerator pedal application (not shown), the throttle may be moved to a fully open position, also termed a wide open throttle position, to allow maximum airflow into an intake manifold (e.g., intake manifold 44 shown in FIG. 1) and into engine cylinders (e.g., cylinder 30 shown in FIG. 1). Thus, in response to an elevated torque request being received while the throttle was held at the more closed position for vacuum generation, the throttle may be opened and further vacuum generation may be aborted until engine conditions permit reclosing of the throttle. Due to throttle opening, vacuum levels within the brake booster reservoir remain at or around threshold 607 beyond $t_5$. The EGR valve may be fully closed during wide open throttle conditions to reduce engine dilution and improve engine torque output. Simultaneously, the wastegate may also be moved to a fully closed position so that boost pressure can be increased rapidly, enabling a significant increase in engine torque. Between $t_5$ and $t_6$, the vehicle speed may rise sharply in response to the accelerator pedal application, and then as the accelerator pedal is gradually released, the vehicle speed may fall at or around $t_6$. Engine torque and boost pressure may follow a similar path and the throttle may be moved from a fully open position to a partly open position at $t_6$ based on existing operating conditions. Between $t_6$ and $t_7$, the vehicle may travel at steady state conditions wherein the vehicle speed, torque, and boost pressure return to levels prior to $t_1$. Further, the EGR valve and the wastegate are returned to nominal positions where EGR valve is more open and the wastegate is more closed.

At $t_7$, the brake pedal may be applied with less force than brake pedal application at $t_1$ or $t_3$. Thus, vacuum in the brake booster reservoir may be consumed to a lesser extent. However, since the vacuum levels within the reservoir are just at or around threshold 607, the application of brakes at $t_7$ results in vacuum levels decreasing below threshold 607 between $t_7$ and $t_8$. As the brakes are applied, vehicle speed and engine torque reduce and the throttle may be moved to a more closed position. In addition, the throttle may be held at the more closed position so that vacuum can be generated for brake application. The EGR valve stays in its mostly open position while boost pressure may decrease slightly as the wastegate is opened slightly.

At $t_8$, the brake pedal may be released and the throttle may be moved to a partly open position. Thus between $t_8$ and $t_9$, engine torque may rise and vehicle speed may increase. At $t_9$, since steady state driving conditions may exist, and the vacuum levels are below threshold 607, the controller may move the throttle to a mostly closed position to generate vacuum. Between $t_9$ and $t_{10}$, therefore, vacuum levels within the brake booster reservoir increase steadily until adequate vacuum levels are achieved at $t_{10}$. To prevent a reduction in engine torque between $t_9$ and $t_{10}$ as the throttle is moved to a more closed position, boost pressure may be increased by moving the wastegate to a more closed position at $t_9$. The controller may decide to use boost pressure alone and not reduce EGR levels for maintaining engine torque output. Therefore, the EGR valve is retained at a mostly open position.

At $t_{10}$, vacuum demand is met and the throttle may be returned to a partly open position. Simultaneously, the wastegate may be moved to a more open position and boost pressure may reduce to a level similar to that prior to $t_1$.

A method for an engine may comprise sliding a throttle valve within a throttle body of a throttle along an axis substantially parallel to a flow direction of intake gasses in the throttle, generating vacuum at a ridge of the throttle valve via intake air flowing past the ridge between the throttle valve and a throttle fixture of the throttle valve, and applying the generated vacuum to a vacuum consumption device fluidly coupled to the ridge of the throttle valve and flowing air from the vacuum consumption device into the throttle body. In the above method, the sliding the throttle valve may be based on an amount of vacuum demand of the vacuum consumption device, and wherein the sliding includes moving the throttle valve downstream within the throttle body, towards the throttle fixture and a more closed position, as the vacuum demand increases. The method may further comprising one or more of, reducing an exhaust gas recirculation rate, increasing a boost pressure, and increasing a duration of intake valve opening.

In this way, a slidable throttle valve positioned within a throttle may be displaced within the throttle to generate vacuum from intake airflow when adjusted to a more closed position. The throttle valve may include a hollow interior passage that fluidically connects the throttle valve to a vacuum consumption device. In response to vacuum demand from the vacuum consumption device, the position of the throttle valve may be adjusted to a more closed position to increase vacuum generation as the demand for vacuum increases. As the throttle valve is adjusted towards a more closed position and airflow within the engine intake is decreased, engine torque output may be sustained by modifying one or more of boost pressure, EGR flow and valve timing.

In this way, the functions of an aspirator may be combined with those of a throttle, enabling a reduction in packaging space. Additionally, by removing the need for a separate aspirator, expenses may be reduced. Total airflow rate into the intake manifold at engine idle and low load conditions may be controlled in a simpler manner by adjusting the position of a throttle valve positioned within the throttle to a more closed position. An amount of vacuum generated between the throttle valve and a flow obstruction in the throttle may be increased when adjusting the throttle valve towards a more closed position. Thus, an extra aspirator shut off valve to control aspirator flow rate into the intake may be avoided enabling a further savings in costs. Further, a technical effect of increasing an amount of vacuum generated at a throttle valve, and therefore an amount of air drawn from a vacuum consumptions device coupled to the throttle valve may be increased by including a slidable throttle valve in the throttle. The shape, size, and position of the throttle valve may be adjusted without changing any other component of the throttle or engine intake. As such, the size and shape of the throttle valve may be adjusted to increase the amount of vacuum generated when adjusting the throttle valve to a more closed position.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A throttle coupled in an intake conduit of an engine intake, the throttle comprising: a throttle body that adjusts vacuum in an intake manifold; a slidable throttle valve included within the throttle body, the throttle valve comprising a hollow passage coupling a vacuum consumption device to an interior of the throttle body; and an inwardly projecting flange coupled within the throttle body.

2. The throttle of claim 1, wherein the throttle body is rectangular and includes four substantially planar walls: two side walls, a top wall, and a bottom wall, and where a cross-sectional area of the throttle body is greater than that of the intake conduit.

3. The throttle of claim 2, wherein the inwardly projecting flange is physically coupled to, and in sealing contact with an interior surface of the bottom wall and where the flange extends between and is in sealing contact with interior surfaces of the two side walls.

4. The throttle of claim 2, wherein the throttle valve is physically coupled to, and in sealing contact with an interior surface of the top wall, and where the throttle valve extends between and is in sealing contact with, interior surfaces of the two side walls.

5. The throttle of claim 1, wherein the inwardly projecting flange is positioned more proximate a downstream end of the throttle body than an upstream end of the throttle body.

6. The throttle of claim 1, further comprising, an inlet cone coupling an upstream portion of the intake conduit to an upstream end of the throttle body, where a first end of the inlet cone is coupled to the upstream portion of the intake conduit, and where a second end of the inlet cone is coupled to the upstream end of the throttle body, and where a cross-sectional area of the inlet cone is greater at the second end than the first end.

7. The throttle of claim 1, further comprising, an outlet cone coupling a downstream portion of the intake conduit to a downstream end of the throttle body, where a first end of the outlet cone is coupled to the downstream end of the throttle body, and where a second end of the outlet cone is coupled to the intake conduit, and where a cross-sectional area of the outlet cone is greater at the first end than the second end.

8. The throttle of claim 1, where the inwardly projecting flange and throttle valve each comprise respective upstream first surfaces facing oncoming intake gas flow, the first surfaces orientated at respective first angles with respect to a direction of flow of oncoming intake gasses, and where the inwardly projecting flange and throttle valve each comprise respective downstream second surfaces facing away from oncoming intake gas flow, the second surfaces orientated at respective second angles with respect to the flow direction of oncoming intake gasses, where the second angles are less than the respective first angles.

9. The throttle of claim 1, wherein the throttle valve is movable relative to the flange along a longitudinal axis of the throttle body between an open first position and a closed second position, and where an opening in the throttle body formed between the throttle valve and the flange increases with increasing deflection of the throttle valve towards the open first position, away from the closed second position.

10. The throttle of claim 9, further comprising, a motor physically coupled to the throttle body for adjusting the throttle valve between the first and second positions.

11. The throttle of claim 1, wherein the throttle valve includes an aperture formed at an apex of the throttle valve by the hollow passage, and where a Venturi effect is created at the apex, and where a magnitude of the Venturi effect increases for decreases in a distance between the throttle valve and the flange.

12. The throttle of claim 1, wherein the vacuum consumption device is one of a brake booster, a fuel vapor canister, and a vacuum actuated valve.

13. A system comprising: an engine including an intake conduit; a throttle body, that adjusts vacuum in an intake manifold, included in an engine intake, the throttle body comprising: a throttle valve slidable along an axis substantially parallel to a direction of intake gas flow in the throttle body between an open first position and a closed second position, the throttle valve comprising a hollow passage fluidically coupling a vacuum consumption device to an interior of the throttle body; and an inwardly projecting flow obstruction coupled within the throttle body; and a controller with computer-readable instruction stored in non-transitory memory for: in response to increases in vacuum demand from the vacuum consumption device, adjusting the throttle valve towards a more closed position to increase an amount of vacuum generated at an aperture of the throttle valve formed by the hollow passage at an inwardly extending tip of the throttle valve.

14. The system of claim 13, wherein an opening in the throttle body formed between the throttle valve and the flow obstruction and therefore an amount of airflow through the intake conduit decreases, and the amount of vacuum generated at the aperture increases, as the throttle valve is adjusted towards the closed second position.

15. The system of claim 13, further comprising, a motor in electrical communication with the controller, the motor physically coupled to the throttle valve, and where the motor adjusts the position of the throttle valve based on signals received from the controller.

16. The system of claim 13, wherein a slope of an upstream first surface of the throttle valve facing oncoming intake gas flow is greater than a slope of a downstream second surface of the throttle valve facing away from oncoming intake gas flow.

17. The system of claim 13, wherein a slope of an upstream first surface of the flow obstruction facing oncoming intake gas flow is greater than a slope of a downstream second surface of the flow obstruction facing away from oncoming intake gas flow.

* * * * *